(12) United States Patent
Hattori et al.

(10) Patent No.: US 6,802,382 B2
(45) Date of Patent: Oct. 12, 2004

(54) ROBOT MOVING ON LEGS AND CONTROL METHOD THEREFOR, AND RELATIVE MOVEMENT MEASURING SENSOR FOR ROBOT MOVING ON LEGS

(75) Inventors: Yuichi Hattori, Chiba (JP); Jinichi Yamaguchi, 5-14-38, Tamadaira 5-chome, Hino-shi, Tokyo 191-0062 (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 148 days.

(21) Appl. No.: 09/980,143

(22) PCT Filed: Apr. 3, 2001

(86) PCT No.: PCT/JP01/02895
§ 371 (c)(1),
(2), (4) Date: Mar. 4, 2002

(87) PCT Pub. No.: WO01/74546
PCT Pub. Date: Oct. 11, 2001

(65) Prior Publication Data
US 2003/0009259 A1 Jan. 9, 2003

(30) Foreign Application Priority Data
Apr. 3, 2000 (JP) ......................................... 2000-100708

(51) Int. Cl.[7] .............................................. B62D 57/02
(52) U.S. Cl. ........................................... 180/8.6; 901/1
(58) Field of Search ........................... 180/8.1, 8.5, 8.6; 901/1, 701

(56) References Cited

U.S. PATENT DOCUMENTS

| | | | | |
|---|---|---|---|---|
| 912,108 A | * | 2/1909 | Gaskill .................... | 180/8.6 |
| 4,202,423 A | * | 5/1980 | Soto ........................ | 180/8.6 |
| 4,662,465 A | * | 5/1987 | Stewart ................... | 180/8.1 |
| 5,151,859 A | * | 9/1992 | Yoshino et al. ............ | 701/23 |
| 5,158,493 A | * | 10/1992 | Morgrey .................... | 446/355 |
| 5,282,460 A | * | 2/1994 | Boldt ....................... | 601/13 |
| 5,343,397 A | * | 8/1994 | Yoshino et al. ............ | 701/23 |
| 5,355,064 A | | 10/1994 | Yoshino et al. | |
| 5,357,433 A | | 10/1994 | Takenaka et al. | |
| 5,378,969 A | * | 1/1995 | Haikawa ................ | 318/568.12 |
| 5,455,497 A | * | 10/1995 | Hirose et al. ........... | 318/568.12 |
| 5,737,217 A | * | 4/1998 | Nishikawa et al. ........ | 700/56 |
| 5,974,366 A | * | 10/1999 | Kawai et al. .............. | 702/150 |
| 6,317,652 B1 | * | 11/2001 | Osada ........................ | 700/245 |
| 6,438,454 B1 | * | 8/2002 | Kuroki ....................... | 700/245 |
| 6,526,331 B2 | * | 2/2003 | Hirose ........................ | 700/245 |
| 6,527,071 B1 | * | 3/2003 | Villedieu ..................... | 180/8.1 |
| 6,532,400 B1 | * | 3/2003 | Jacobs ........................ | 700/245 |
| 6,534,943 B1 | * | 3/2003 | Hornby et al. ........... | 318/568.12 |
| 6,556,892 B2 | * | 4/2003 | Kuroki et al. .............. | 700/245 |
| 6,564,888 B1 | * | 5/2003 | Gomi et al. ................. | 180/8.6 |
| 6,652,351 B1 | * | 11/2003 | Rehkemper et al. ........ | 446/354 |

FOREIGN PATENT DOCUMENTS

| | | |
|---|---|---|
| JP | 5-245780 | 9/1993 |
| JP | 5-318340 | 12/1993 |

* cited by examiner

Primary Examiner—Lesley D. Morris
Assistant Examiner—Paul Royal, Jr.
(74) Attorney, Agent, or Firm—Frommer Lawrence & Haug LLP; William S. Frommer; Dennis M. Smid

(57) ABSTRACT

A legged mobile robot having having at least a plurality of movable legs. This robot includes, in addition to a road surface touching sensor for confirming the ground touching state between the foot part and the road surface, a relative movement measurement sensor for measuring the relative movement between the foot part and the road surface. The robot has its operation controlled on the basis of the amount of relative movement between the foot part and the road surface, so that, when an offset is produced between the intended or scheduled trajectory and the actual trajectory, the operation may be controlled adaptively to execute the robot operation.

26 Claims, 22 Drawing Sheets

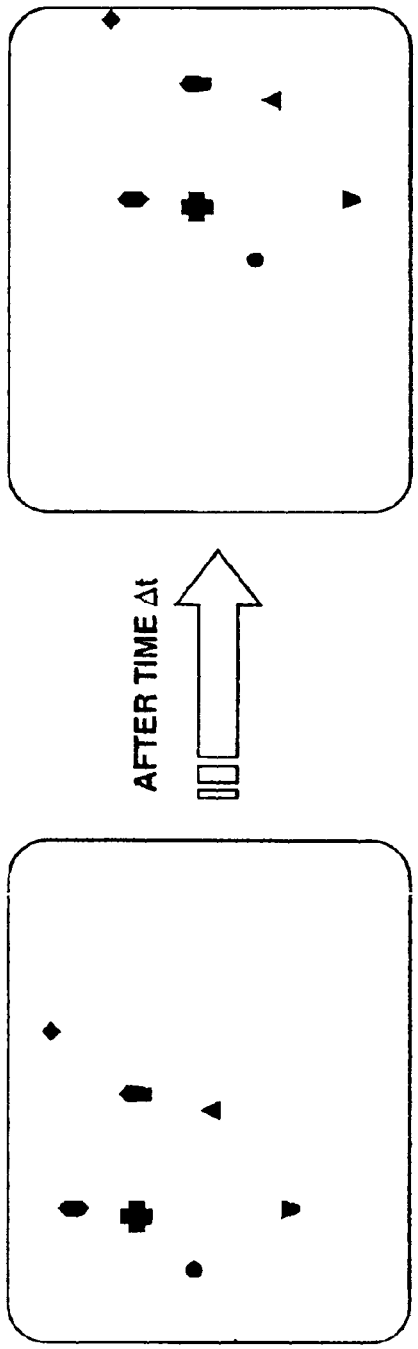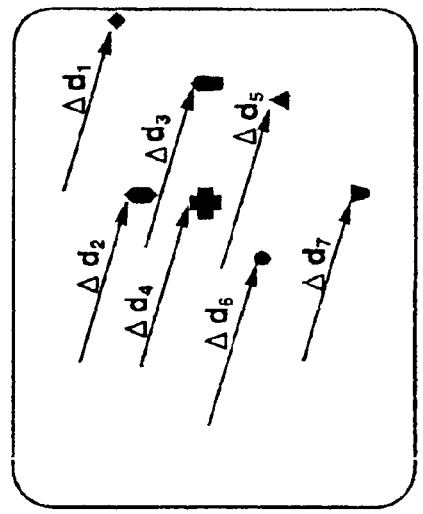
FIG.14

ROBOT MOVING ON LEGS AND CONTROL METHOD THEREFOR, AND RELATIVE MOVEMENT MEASURING SENSOR FOR ROBOT MOVING ON LEGS

This application is a 371 of PCT/JP01/02895 filed Apr. 3, 2001.

TECHNICAL FIELD

This invention relates to a legged mobile robot having at least plural movable legs and specifically to a legged mobile robot capable of walking or otherwise performing movement (locomotion) operations with its movable legs on variable road surfaces. More specifically, it relates to a legged mobile robot capable of walking or otherwise performing movement operations with its movable legs on road surfaces, the, surface states of which are unknown, and also to a legged mobile robot capable of performing adaptive legged movement operations depending on prevailing road surface conditions.

BACKGROUND ART

A mechanical apparatus for performing movements simulating the movement of the human being using electrical or magnetic operation is termed a "robot". The etymology of the term robot is to be "ROBOTA" (slave machine) of the Slavic language. The robots started to be used widely in this country towards the end of sixtieth. Most of the robots used were industrial robots, such as manipulators or transporting robots, aimed at automation or unmanned operations in plants.

The standstill type robot, installed and used at a fixed place, such as armed robots, are in operation only in a stationary or local working space, such as for assembling or sorting of component parts. On the other hand, the mobile robots are not limited as to working space and are movable on a preset or undefined path in an unrestricted fashion to perform operations to take the place of human operators or to offer variegated services to take the place of the human being, dogs or other living organisms. The legged mobile robots, while being unstable and difficult to control as to its orientation or walking, as compared to crawler or tire type robots, are superior in climbing up and down a ladder or a staircase, in riding over obstacles or walking or running flexibly on a leveled or unleveled terrain.

In recent years, researches and development in legged mobile robots, including pet type robots, simulating the bodily mechanism or movements of animals, such as quadruples, e.g., dogs or cats, or so-called humanoid robots, simulating the bodily mechanism or movements of animals erected and walking on feet, such as human being, are progressing, and expectations may be made of practical utilization of these robot types.

The significance of researching and developing the legged mobile robots, termed humanoid robots, may be grasped from, for example, the following two points:

One is the point from the human science. That is, the mechanism of the natural movements of the human being, including the walking, may be clarified scientifically through the process of creating a robot having the structure of legs and/or feet, similar to that of the human being, and of devising its controlling method to simulate the walking movements of the human being. The results of these researches can possibly be fed back to variable fields of researches dealing with the movement mechanism of the human being, such as the fields of human engineering, rehabilitation engineering or sports science.

The other is the development of practically useful robots, supporting the human life as a partner, that is supporting the human activities in various aspects of the everyday life such as in living environment. With the robots of this type, it is necessary to learn the method for adaptation to the human being with different personalities and to different environments as the robots are taught from the human being to make further progress in functional aspects. It may be surmised that, if the, robots are "humanoid", that is of the same form or structure as the human being, the communication between the human being and the robot will be smoother.

For example, if the robot is to be taught as to a technique of passing through a chamber as he evades an obstacle that he should not tramp, it will be far easier for a user (operator) to teach it in case the robot is the robot walking on two legs than in case the robot is of the completely different structure from the teacher as in the case of the crawler or four-legged robot. Similarly, such a robot would learn more easily. In this respect, see "Control of Robots Walking on Two Feet" of Automobile Technical Association of Japan, Kanto Branch, <KOSO>, No. 25, April 1996.

The working space and the living space of the human being is mostly formed to suit to the bodily mechanism or pattern of behavior of the human being erected and walking on two legs. Stated differently, there exist too many obstacles in the human living space for the mechanical systems of the current technical level having wheels or other driving devices as movement means. In order for the mechanical system, that is the robot, to support or act for the human being in variable human operations and to adapt itself more deeply to the living space of the human being, it is desirable that the movable range of the robot is approximately the same as that of the human being. This accounts for the expectations made of development of practically useful legged mobile robot. The human type configuration of the robot may be said to be indispensable in order for the robot to adapt itself more readily to the human living environment.

A number of proposals have already been made for achieving orientation control or stabilized walking of the robot of the type performing legged movement using two legs. The stable "walking" herein means "movement on feet without tumbling down".

The stabilized orientation control for a robot is crucial in evading its leveling. The reason is that leveling means interruption of the operation being performed by the robot and considerable time and labor is needed until the robot erects itself from its leveled state to re-initiate the operation, and that, more importantly, the leveling tends to inflict a fatal damage not only to the robot but also the object against which has impinged the robot. Thus, stabilized orientation control and prevention of leveling during walking is most crucial in the engineering and development of the legged mobile robot.

During walking, the force of gravity, the force of inertia and the moment thereof act from the walking system to the road surface due to the force of gravity and the acceleration produced by the walking movement. According to the "d'Alembert's principle", these are counterbalanced by the reaction of the floor as the reaction from the floor surface to the walking system, that is the reactive moment of the floor. As a conclusion of mechanical inferences, a point of zero pitch axis and roll axis moment, that is a zero moment point (ZMP), exists on or inside a side of a supporting polygon delimited by the contact point of the foot sole with the ground and the road surface.

The majority of proposals so far made for preventing the leveling of the legged mobile robot use this ZMP as the criterium in judging the stability in walking. The generation of a pattern of walking on two legs, derived from the ZMP criterium, has advantages that the ground touching point of the foot sole can be previously set such that kinematic constraint conditions of the foot end in compliance with the road surface can be considered more readily. Moreover, using the ZMP as the criterium in verifying the stability means that not the force but the trajectory is to be handled as a target value in movement control, thus enhancing the technical feasibility. Meanwhile the concept of the ZMP and using this ZMP as the criterium in judging the walking stability of the robot is stated in Miomir Vukobratovic, "Legged Locomotion Robots" (Ichiro KATO, "Walking Robots and Artificial Legs", published by Nikkan Kogyo Shimbun K K).

However, the legged mobile robot has made but one step from the stage of researches and a number of technical difficulties are still left. For example, the surface states of the road, specifically whether or not the terrain is leveled, or the frictional coefficient, which affects the legged walking significantly, are as yet not tackled sufficiently.

In general, the legged mobile robot performs walking movements as scheduled. In Japanese Laying-Open Patent Publication S-62-97006, there is disclosed a multi-joint walking robot control device in which pre-stored walking pattern data are used to simplify a control program and in which the respective data of the walking pattern can be linked intimately. However, in actual walking, it is a frequent occurrence that relative movement between the road surface and the foot sole, such as slip, is produced due to the relation with respect to the road surface, or other factors, such as wind from a lateral side or an external force, or a conflict with an unknown obstacle.

The point of the center of gravity is higher and the ZMP stability area defining the walking is narrower with the two-legged robot, such as humanoid, than with a four-legged robot. Thus, the problem of variations in orientation due to changes in the road surface state is particularly critical in the two-legged mobile robot.

FIGS. 1 to 4 show how a legged mobile robot 2000 performs walking on two legs. As shown therein, the legged mobile robot 2000 is able to realize walking on two legs by repeating walking periods each consisting in the following movement time intervals:

(1) the time period in which the robot is supported by a left leg 2002, with the right leg 2001 lifted (FIG. 1);
(2) the time period during which a right leg 2003 of the robot contacts the floor, with the both legs thus being set on the floor (FIG. 2);
(3) the time period during which the left leg 2002 is lifted, with the robot being supported only on the right leg 2001 (FIG. 3); and
(4) the time period during which the left leg 2004 of the robot contacts the floor, with the both legs thus being set on the floor (FIG. 4).

In robot walking control, a target trajectory of the lower legs is previously measured and the scheduled trajectory is corrected in each of the above time periods. For example, during the time period when the both legs support the robot, correction of the trajectory of the lower legs with the road surface information is halted and the total correction quantity with respect to the scheduled trajectory is used to correct the waist part of the robot to a preset value. During the time period when the robot is supported on one leg, a correction trajectory is generated which will restore the relative position between the ankle of the corrected side and the waist part to the scheduled trajectory. A more specified correction is performed by a five-order polynominal so that the position, speed and the acceleration for decreasing the offset with respect to the ZMP will be continuous (see Takanishi, "Control of Two-Legged Robot" Automobile Technical Association of Japan, Kanto Branch, <KOSO>, No. 25, April 1996.

Taking the time period of support on a sole leg shown in FIG. 1, the case in which the road surface is relatively moved (slipped) with respect to the foot sole. In the two-legged mobile robot 2000, it is expected from the trajectory scheming that, during the time period when the erected sole leg contacts the road surface, no relative movement (slip) of the erected leg occurs with respect to the road surface.

FIG. 5 shows the state in which the relative movement (slip) of the left leg 2004 has occurred with respect to the road surface during the time period when the erected left leg 2002 contacts the road surface face. As shown, the left leg 2004 of the robot 2000 is relatively moved by $\Delta X$ in the proceeding direction (roll axis direction) and $\Delta Y$ in the direction perpendicular thereto (pitch axis direction). That is, since the left leg 2004 is scheduled to contact the road surface completely; there is produced deviation ($\Delta X$, $\Delta Y$) between the scheduled or intended trajectory and the actual trajectory of the robot.

During the time period when the erected sole leg contacts the road surface, it is necessary to generate a corrected trajectory so that the relative positions of the waist and the wrinkles of the feet corrected will be restored to the scheduled trajectory. However, it is extremely difficult to measure the relative movement with respect to the road surface (slip) to a correct value, using a detection system, loaded as a standard item on a robot, such as acceleration sensor or visual perception by a camera. The result is that the robot is unable to correct the trajectory accurately and promptly, thus possibly leading to the overlooked relative movements until such time the difference from the scheduled trajectory is increased to s considerable extent. Such difference between the scheduled trajectory and the actual trajectory may lead to failure in stabilized orientation control or collision with an obstacle which should have been evaded, thus occasionally resulting in leveling down of the robot or in the destruction of the robot and its near-by objects.

FIG. 6 shows the state in which, during the time period when the erected left leg 2002 contacts the road surface, the relative movement (slip) of the left leg 2004 is produced, in which the left leg 2004 is rotated around a normal of the road surface or the normal line drawn from the road surface (yaw axis). As shown, the left leg 2004 of the robot 2000 has been rotated through $\Delta\theta$ relative to the normal line drawn from the road surface. That is, since the left leg 2004 is about to contact the road surface completely, a rotational offset of $\Delta\theta$ is produced between the scheduled or intended trajectory and the actual trajectory of the robot 2000.

Such rotational offset is extremely difficult to detect to an accurate value, using a detection system loaded as a standard item on the robot, such as gyro sensor or visual perception by a camera. Such offsetting around a normal of the road surface affects the proceeding direction of the robot, the continued walking operation may lead to significant trajectory deviation.

In general, when relative movements are produced in the respective legs 2003, 2004, these movements are frequently produced on synthesis of the relative movements within a plane parallel to the road surface shown in FIG. 5 and those around the normal line drawn from the road surface shown in FIG. 6, thus enhancing the adverse effects on the walking.

In this consideration, axle force sensors for sensing the force acting on the legs of the robot may be used to measure the force of reaction from the road surface to eliminate the effect of the relative movements (slip). It is however extremely difficult to remove the adverse effect completely.

It may be contemplated to measure the orientation of the robot itself by a gyro sensor or an acceleration sensor, or with a visual sensor, such as camera, to measure the effect of the relative movement (slip) or to feed back the result to the subsequent trajectory schedule. However, these measures frequently lead to problems in measurement precision or response speed. In case of a robot destined to walk on variegated road surfaces, such walking that permits of no relative movement (slip) whatsoever is impossible in reality, while an approach to slip elimination is not meritorious from the perspective of the movement speed.

If the notion that, when the legged mobile robot walks, relative movements (slips) are necessarily produced in the legs, is maintained, such a walking process may be contemplated in which relative movements are tolerated and the slip is quantified, analyzed and managed while the slip is exploited positively.

When a person walks, relative movements (slip) may be frequently produced between the road surface and the foot sole. Thus, for realization of variegated walking patterns in the legged mobile robot, it is necessary to take the relative movements (slip) positively into the trajectory schedule and further to execute trajectory correction. To this end, it is crucial in a robot performing operations with its legs that the relative movement (slip) of the respective legs with respect to the road surfaced can be recognized or measured.

The majority of the sensors provided on the feet of the conventional legged mobile robots measure the force of reaction from the road surface or the distance to the road surface. Stated differently, the equipment for measuring or recognizing the physical quantity corresponding to the relative movement (slip) of the respective legs with respect to the road surface, such as movement in a plane parallel to the road surface or movements around the normal line drawn from the road surface, has not been applied so far to the robot. In realizing the so-called foot sole sensation on the legged mobile robot, it may be contemplated to be crucial to detect and quantify the relative movement (slip) of the respective legs with respect to the road surface.

DISCLOSURE OF THE INVENTION

It is an object of the present invention to provide a legged mobile robot capable of walking on variable road surfaces and of performing movement operations on feet with movable legs.

It is another object of the present invention to provide a legged mobile robot capable of performing walking or other operations on feet with movable legs on variable road surfaces.

It is still another object of the present invention to provide a legged mobile robot capable of performing adaptive movement operation on feet depending on the prevailing road surface states.

It is still another object of the present invention to provide a legged mobile robot capable of performing adaptive operational control, such as correction of scheduled trajectories, as it recognizes or measures the relative movement (slip) of the respective legs with respect to the road surface.

It is yet another object of the present invention to provide a legged mobile robot capable of performing adaptive operational control of the legged mobile robot, such as by recognizing or measuring the relative movement of the respective legs with respect to the road surface to correct the scheduled trajectory.

For accomplishing these objects, the present invention provides a legged mobile robot having at least a plurality of movable legs, including a relative movement measurement sensor arranged on the foot sole of each movable leg for measuring the amounts of relative movements between the foot part and the road surface; and a controller for controlling the movements of the legged mobile robot based on the amounts of relative movements between the foot part and the road surface as measured by the relative movement measurement sensor.

The relative movement measurement sensor preferably measures the amount of the relative movement of the foot part relative to a direction parallel to the road surface and/or the amount of the relative movement of the foot part around a normal of the road surface.

The relative movement measurement sensor preferably includes a rotationally mounted ball having its surface partially exposed to outside the foot sole, a first rotation unit for detecting the rotation in a first direction of the ball, a second rotation unit for detecting the rotation in a second direction of the ball and a calculation unit for calculating the amount of the relative movement of the foot part relative to the road surface in the first and second directions.

Alternatively, the relative movement measurement sensor includes imaging means for imaging a ground touching surface of the foot part, image processing means for comparing images photographed by the imaging means at a preset time interval and calculating means for calculating the amount of the relative movement relative to the road surface of the foot part at the preset time interval based on the results of image comparison by the image processing means.

If the relative movement measurement sensor is able to measure the amount of the relative movement of the foot part in a direction parallel to the road surface, the amount of the relative movement around a normal of the road surface may be calculated by chronologically joining the amounts of the relative movement in the direct parallel to the road surface of the foot part as measured at present time intervals.

Two or more relative movement measurement sensors may be provided on each foot part at a spacing from one another, in which case the measured results of the relative movement measurement sensors are compared to one another to calculate the amount of the relative movement of the foot part around a normal of the road surface.

The controller may halt the movement on the road surface responsive to the amount of relative movement between the foot part and the road surface exceeding a preset threshold during movement on the road surface.

After halting the movement operation, decision may be made as to whether or not the movement operation can further be continued. A preset assistance request operation may be executed when it is verified that the movement operation cannot be further continued. The assistance request may be made by uttering a speech or calling a near-by user by exploiting wireless communication. Alternatively, the road surface state may be searched and a behavior may be executed responsive to the searched results.

The controller may also transfer to a safe movement operation pattern for a road surface responsive to the amount of the relative movement between the foot part and the road surface exceeding a preset threshold value during movement on the road surface. The safe movement operation pattern herein may include enlarging the incidence angle of the foot part touching the road surface, lowering the movement speed, diminishing the footstep of each movable leg and correcting the ZMP trajectory.

The controller may also transfer to the movement operation under searching the road surface responsive to responsive to the amount of the relative movement between the foot part and the road surface exceeding a preset threshold value during walking on the road surface.

The present invention also includes a method for controlling a legged mobile robot having at least a plurality of movable legs, including a measurement step of measuring the amounts of relative movements between the foot part and the road surface when the respective movable legs touch the road surface, and a controlling step of controlling the movements of the legged mobile robot based on the amounts of relative movements between the foot part and the road surface as measured.

According to the present invention, the measurement step measures the amount of the relative movement of the foot part relative to a direction parallel to the road surface and/or the amount of the relative movement of the foot part around a normal of the road surface.

If the measurement unit is to measure the amount of relative movement of the foot part in a direction parallel to the road surface, there may be provided a calculation step of calculating the amount of the relative movement around a normal of the road surface by chronologically joining the amounts of the relative movement in the direction parallel to the road surface of the foot part as measured in the measurement step at present time intervals.

Alternatively, the measurement step may include a calculating step of measuring the amount of the relative movement between the foot part and the road surface at two or more spaced apart points and comparing the amounts of the relative movement measured at two or more points to one another to calculate the amount of the relative movement of the foot part relative to a normal line from the road surface.

In the controlling step, the movement on the road surface may be halted responsive to the amount of the relative movement between the foot part and the road surface exceeding a preset threshold value during movement on the road surface.

It may also be verified, after halting the movement, whether or not the movement operations can be continued further. The preset assistance requesting operation may also be executed if continuation of the movement operation is found to be impossible. The assistance request may include uttering a speech or calling a near-by user by exploiting wireless communication.

The controlling step may halt the movement on the road surface responsive to the amount of the relative movement between the foot part and the road surface exceeding a preset threshold value, during movement on the road surface, to search the state of the road surface. The controlling step may also execute a behavior responsive to the searched result.

The controlling step may also transfer to a safe movement operation pattern for the road surface responsive to the amount of the relative movement between the foot part and road surface exceeding a present threshold value during movement on the road surface 26. The safe movement operation pattern may at least be one of enlarging the incidence angle of the foot part touching the road surface, lowering the movement speed, diminishing the footstep of each movable leg and correcting the ZMP trajectory.

The controlling step may also transfer to the movement operations responsive to the amount of the relative movement between the foot part and the road surface exceeding a preset threshold value during walking on the road surface. The controller may execute the processing of selecting a foot sole suited to the road surface responsive to the amount of the relative movement between the foot part ands the road surface exceeding a preset threshold value during walking on the road surface.

The present invention also provides a relative movement measurement sensor for a legged mobile robot for measuring the amount of relative movement between a foot part and the road surface, the sensor being applicable to a foot part of a legged mobile robot having at least a plurality of movable legs, in which the relative movement measurement sensor includes a rotationally mounted ball having its surface partially exposed to outside the foot sole, a first rotation unit for detecting the rotation in a first direction of the ball, a second rotation unit for detecting the rotation in a second direction of the ball and a calculation unit for calculating the amount of the relative movement of the foot part relative to the road surface in the first and second directions.

The present invention also provides a relative movement measurement sensor for a legged mobile robot for measuring the amount of relative movement between a foot part and the road surface, the sensor being applicable to a foot part of a legged mobile robot having at least a plurality of movable legs, in which the relative movement measurement sensor, imaging means for imaging a ground touching surface of the foot part, image processing means for comparing images photographed by the imaging means at a preset time interval and calculating means for calculating the amount of the relative movement relative to the road surface of the foot part at the preset time interval based on the results of image comparison by the image processing means.

The robot according to the present invention is able to perform variable movement operations on legs, such as walking, using plural movable legs. For example, walking on two-legs may be realized by left and right legs repeatedly performing the operation of supporting the robot on one of the left and, right legs and supporting the robot on both legs in accordance with an intended or scheduled lower limb trajectory scheme. During the time periods when the robot is supported on one leg or on both legs, the scheduled trajectory may be corrected, or a corrected trajectory may be generated, to restore the scheduled trajectory depending on the road surface information or the relative positions between the ankle and waist parts.

During the operations of the robot, erected on legs, it is a frequent occurrence that relative movement, such as slipping, may occur between the foot part erected or touching the ground and the road surface. Such relative movement may cause deviation of the actual trajectory from the scheduled trajectory of the robot to cause leveling down or collision of the robot against an obstacle. It is therefore necessary to measure the amount of relative movement between the foot part and the road surface accurately and to correct the scheduled trajectory based on this amount of relative movement by way of performing adaptive control of the operations being executed by the robot.

In view of the above object, with the legged mobile robot of the present invention, the foot part of each movable leg (foot flat or the foot sole) is provided with a relative movement measurement sensor between the road surface and the leg touching the ground, in addition to the road surface touching sensor for confirming the road touching state between the foot part and the road surface, thus assuring adaptive control even in case the deviation is produced between the intended or scheduled trajectory.

BRIEF DESCRIPTION OF THE DRAWINGS

FIG. 14 shows the state of comparing and calculating photographed images at minor time intervals in the image processing calculating unit.

BEST MODE FOR CARRYING OUT THE INVENTION

Figure 1:
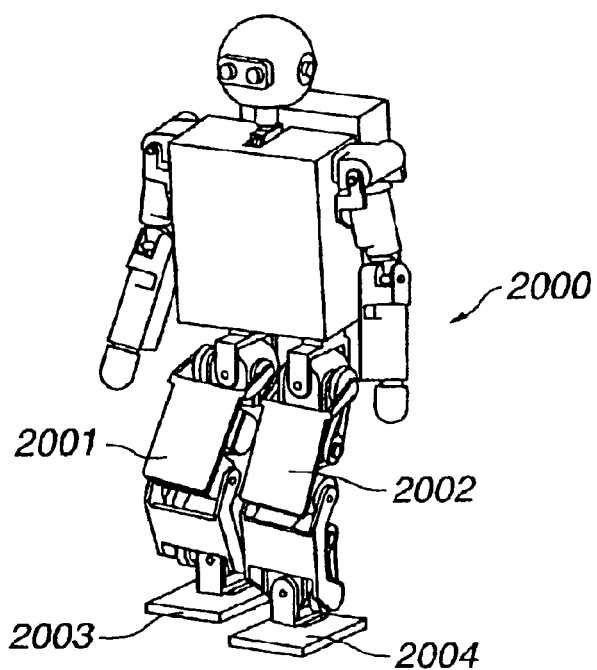
FIG. 1 is a perspective view showing the state of a time period when a legged mobile robot is supported on only the left leg, with the right leg being lifted.
Figure 2:
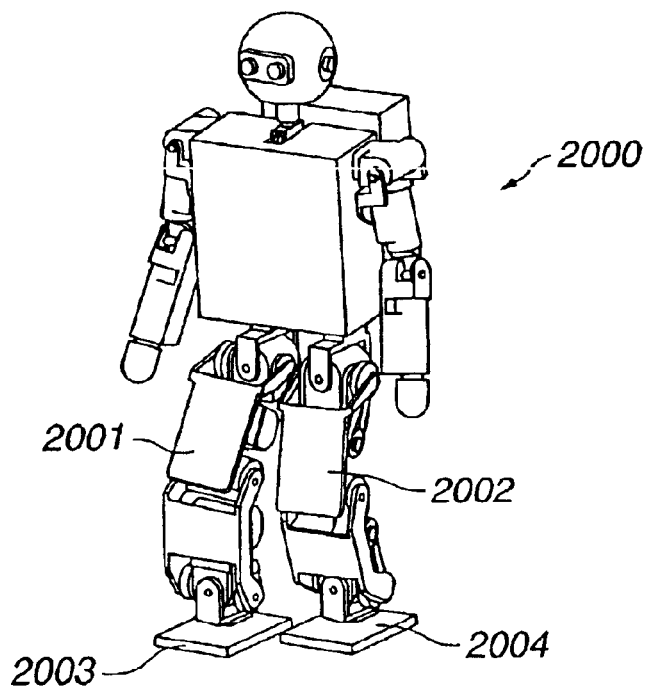
FIG. 2 is a perspective view showing the state of a time period when the legged mobile robot is supported on both legs, with its right leg now contacting the ground.
Figure 3:
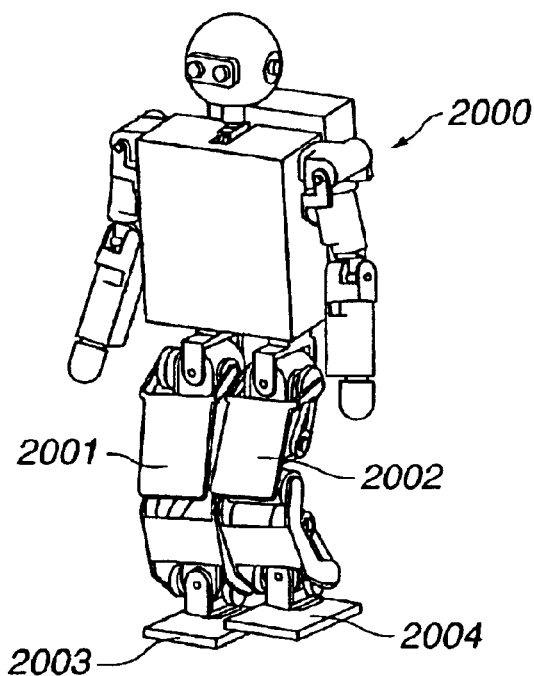
FIG. 3 is a perspective view showing the state of a time period when a legged mobile robot is supported on only the right leg, with the left leg being lifted.
Figure 4:
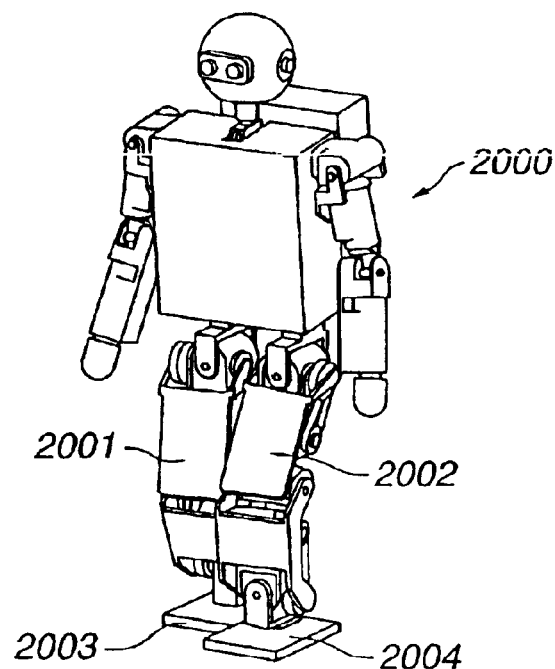
FIG. 4 is a perspective view showing the state of a time period when the legged mobile robot is supported on both legs, with its left leg now contacting the ground.

Referring to the drawings, the present invention will be explained in detail.

Figure 7:
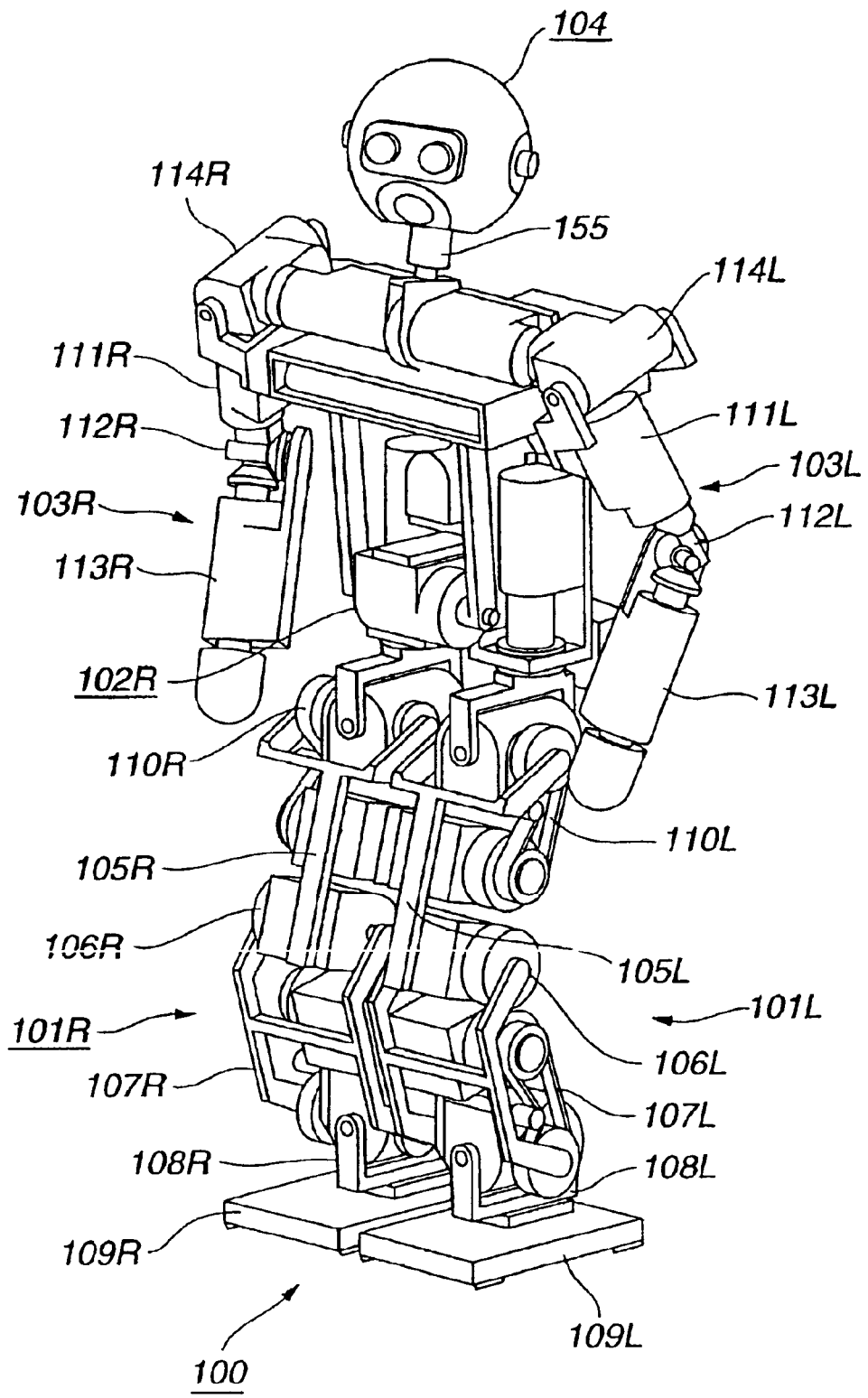
FIG. 7 is a perspective view showing the state in which the legged mobile robot embodying the present invention is seen from the front side.
Figure 8:
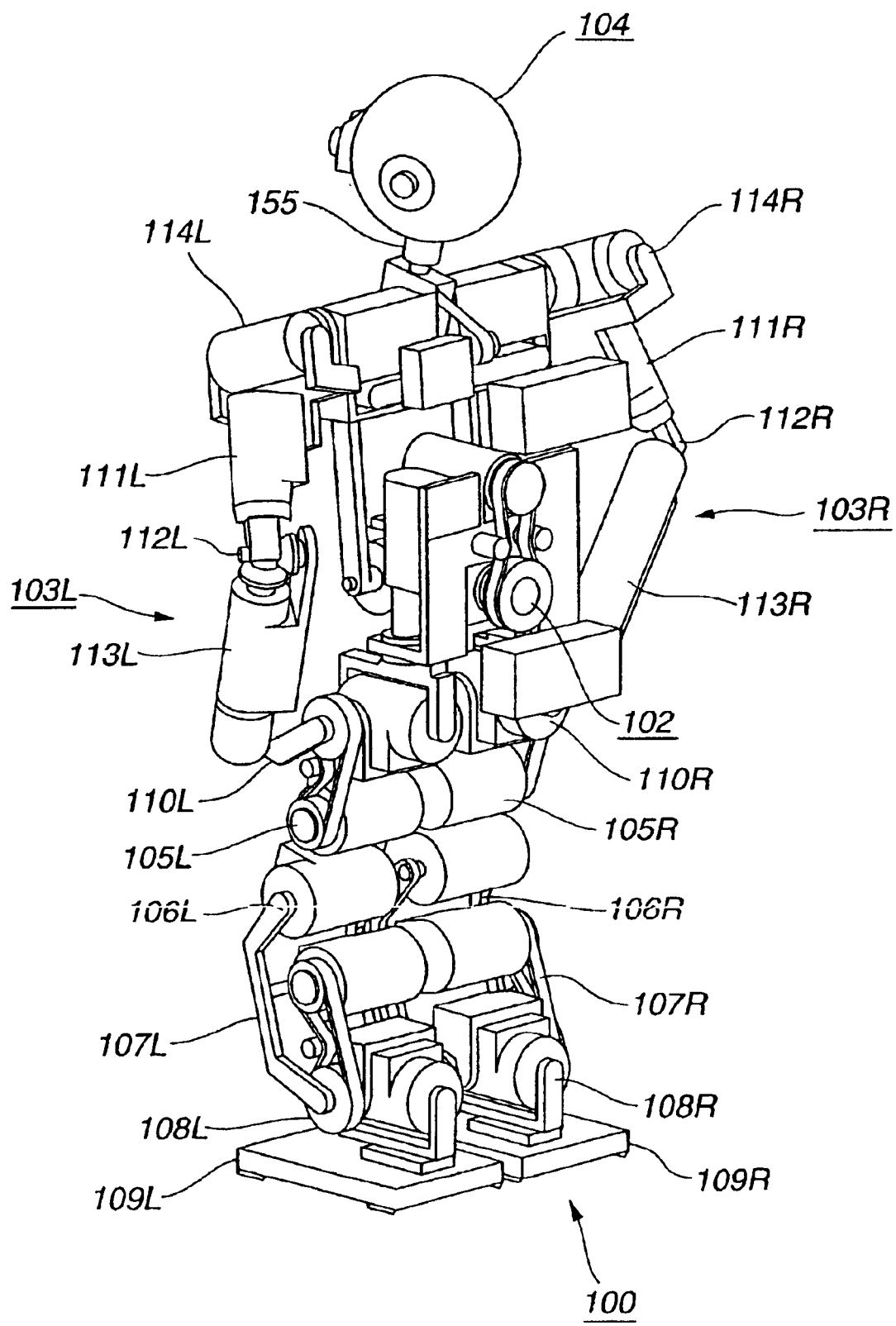
FIG. 8 is a perspective view showing the state in which the legged mobile robot embodying the present invention is seen from the back side.

FIGS. 7 and 8 show a "humanoid" legged mobile robot 100 of the present invention, in the erect state, with the robot been seen from the front and back sides, respectively. As shown, the legged mobile robot 100 includes two feet, that is left and right feet 101R, 101L, responsible for movement (locomotion) on feet, a body trunk 102, left and right legs 103R, 103L and a head 104.

The left and right lower limbs 101R, 101L are made up of thighs 105R, 105L, knee joints 106R, 106L, shins 107R, 107L, ankles 108R, 108L and foot flats 109R, 109L. The left and right lower limbs 101R, 101L are connected by hip joints 110R, 110L at approximately the lowermost points of the body trunk 102. The left and right upper limbs 103R, 103L are made up of upper arms 111R, 111L, knee joints 112R, 112L, and forearms 113R, 113L, and are connected by shoulder joints 114R, 114L at left and right side edges of the body trunk 102. The head 104 is connected by a neck joint 155 to approximately the uppermost center point of the body trunk 102.

Within the body trunk unit is mounted a control unit not shown in FIG. 7 or 8 This controller is a casing carrying a controller forming a driving control for each joint actuator forming the legged mobile robot 100 and a main controller for processing an exterior input from respective sensors as later explained and peripherals such as power source circuitry. The control unit may include a communication interface or communication device for remote control.

Figure 9:
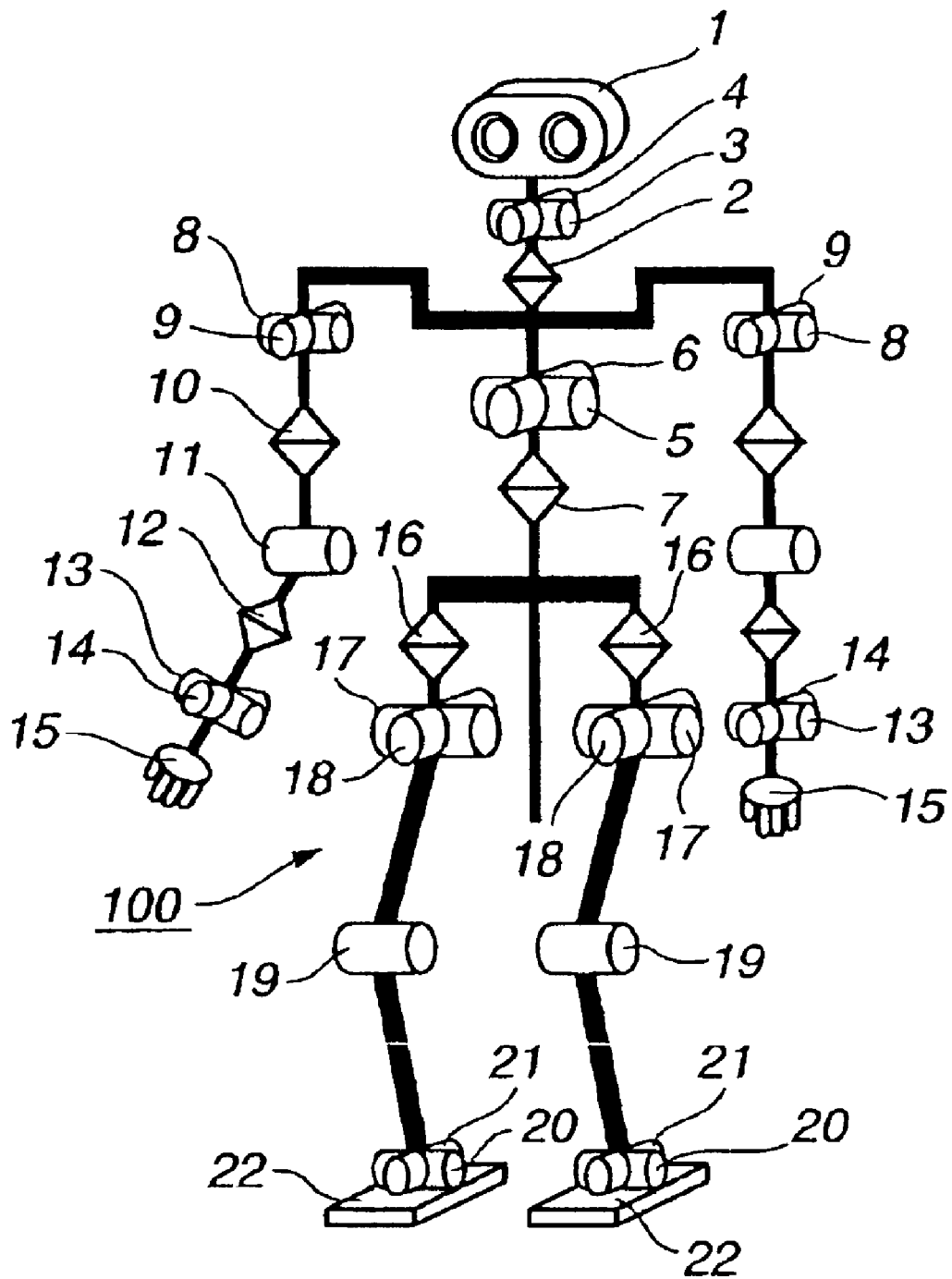
FIG. 9 schematically shows a degree of freedom forming model provided on the legged mobile robot according to the present invention.

FIG. 9 schematically shows the structure of the degree of joint freedom owned by the legged mobile robot 100 of the present invention. As shown, the legged mobile robot 100 is made up of an upper body portion including two arm and a head 1, a lower limb comprised of two feer for realizing the movement operations, and a body trunk portion interconnecting the upper limb and the lower limb.

The neck joint, supporting the head 1, has three degrees of freedom, namely a neck joint yaw axis 2, a neck joint pitch axis 3 and a neck joint roll axis 4.

Each arm is made up of a shoulder joint pitch axis 8, a shoulder joint roll axis 9, an upper arm yaw axis 10, a hinge joint pitch axis 11, a forearm yaw axis 12, a wrist joint pitch axis 13, a wrist joint roll axis 14 and a hand 15. The hand 15 is, in actuality, a multi-joint multi-freedom structure including plural fingers. It is however assumed that the movement of the hand 15 itself has a zero degree of freedom because it contributes to or influences the orientation stability control or walking movement control of the robot 100. Therefore, the left and right arms are assumed to have seven degrees of freedom.

The body treunk portion has three degrees of freedom, namely a body axis pitch axis 5, a body trunk roll axis 6 and a body trunk yaw axis 7.

Left and right feet, forming the lower limb, are each made up of a hip joint yaw axis 16, a hip joint pitch axis 17, a hip joint roll axis 18, a hip joint pitch axis 19, an ankle joint pitch axis 20, an ankle joint roll axis 21 and a foot (foot sole of foot flat)22. The point of intersection of the hip joint pitch axis 17 and the hip joint roll axis 18 defines a hip joint position of the robot 100 of the present embodiment. Although the foot (foor sole) 22 of the human body is, in effect, a structure including the multi-joint multi-freedom foot sole, the foot sole of the legged mobile robot 100 of the present invention is assumed to be of zero degree of freedom. Thus, the left and right feet are made up of six degrees of freedom.

In sum, the legged mobile robot 100, in its entirety, has 3+7×2+3+6×2=32 degrees of freedom. However, the legged mobile robot 100 is not necessarily limited to the 32 degrees of freedom. The degrees of freedom, that is the number of joints, can, of course, be optionally increased or decreased depending on designing and fabrication constraint or design parameter requirements.

In actuality, the above-described respective degrees of freedom of the legged mobile robot 100 are realized as active movements by joint actuators. From a variety of requirements for eliminating any excess bulging portions in the appearance of the overall device to simulate the shape of the body of the human being, and for exercising orientation control on an unstable structure for realizing walking on two feet, the joint actuators are desirably small-sized nd lightweight.

According to the present invention, a small-sized AC servo actuator is used, which is of the type directly coupled to a gearing and which has a one-chip servo control system enclosed in a motor unit. Meanwhile, the small-sized AC servo actuator, applicable to a legged robot, is disclosed in, for example, the specification of the JP Patent Application H-11-33386 assigned to and filed in the name of the present Assignee.

Figure 10:
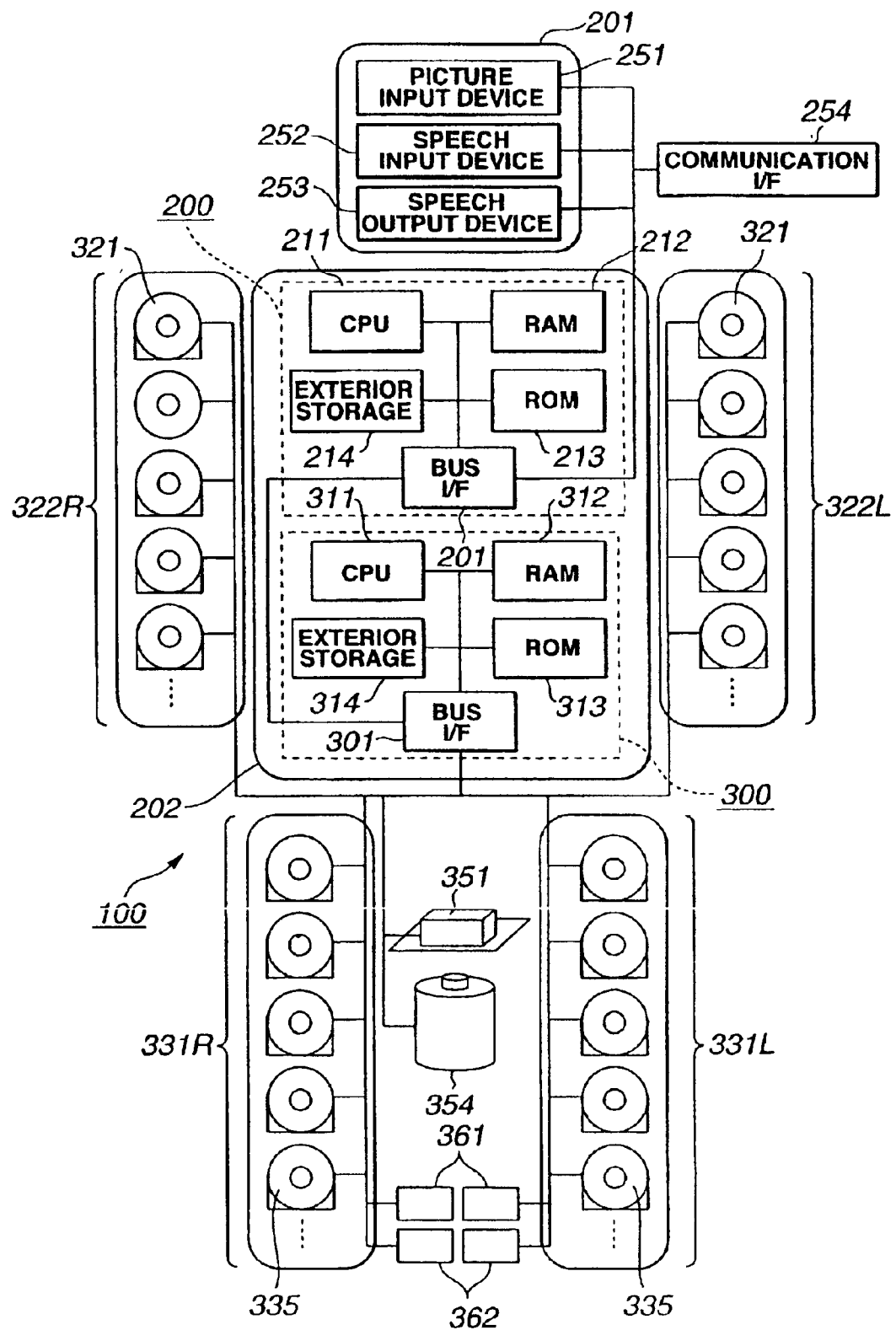
FIG. 10 schematically shows a control system configuration of the legged mobile robot according to the present invention.

FIG. 10 schematically shows a control system configuration of the legged mobile robot 100 according to the present invention. As shown therein, the control system is made up of a thinking control module 200, dynamically reacting to a user input to take charge of the sentiment judgment or feeling expression, and a movement control module 300 controlling the whole body concerted movement of the robot 100 such as driving of the joint actuator.

The thinking control module 200 is an independent information processing apparatus, comprised of a CPU (central processing unit) 211 for executing the calculation concerning sentiment judgment or feeling expression, and a RAM (random access memory) 212, a ROM (read-only memory) 213 and an exterior storage device such as a hard disc drive. The processing may be self-complete in the module 200. It is possible to store the walking pattern or other operational patterns calculated off-line, such as walking patterns, within the exterior storage device 214.

To the thinking control module 200, there are connected, through a bus interface 201, a variety of units, including a picture input device 251, such as a CCD (charge-coupled device) camera provided in the head part 201, a speech input device 252, such as a microphone, a speech output device 253, such as a loudspeaker, or a communication interface 254 for effecting data exchange with a system outside the robot 100 through e.g., LAN (local area network), not shown.

The thinking control module 200 decides the current feeling or will of the legged mobile robot 100, in accordance with stimuli from the outside world or changes in the environment, such as pictures or visual data input from the picture input device 251 or speech or acoustic data input from the speech input device 252. The thinking control module 200 also issues a command to the movement control module 300 to execute the behavior or movement corresponding to the decision of will, that is movements of the four limbs 322R, 322L, 331R and 331L.

The movement control module 300 is comprised of a CPU (central processing unit) 311 for controlling the whole body concerted movements of the robot 100, and a RAM (random access memory) 312, a ROM (read-only memory) 313 and an exterior storage device 314 such as a hard disc drive. The processing may be self-complete within the module 200. The exterior storage device 314 is able to store e.g., the behavioral pattern or the "walking capacity" employing the four limbs. The "walking capacity" is a technical term used in the related art to denote "chronological changes of the joint angle".

To the movement control module 300, there are connected, through a bus interface 301, a variety of devices, such as a joint actuator 321 for realizing respective degrees of freedom of the joints distributed in the whole body of the robot 100 (see FIG. 9), an orientation sensor 351 for measuring the orientation and the tilt of the body trunk 202, road surface contact sensors 361 and relative movement measurement sensors 362, provided on left and right feet or power sourer control devices for supervising the power source such as battery.

It should be noted that the road surface contact sensors 361 are used for detecting the time point of moving away from and reaching the road surface of the respective foot soles. The operating time period of the robot 100 (that is the time period when the robot is supported on both legs or on a sole leg) can be determined based on the outputs of the road surface contact sensors 361. On the other hand, the relative movement measurement sensors 362 are provided for detecting and measuring the amount of relative movement (amount of slip) of the respective legs relative to the road surface. Outputs of the relative movement measurement sensors 362 are used especially during the time period when the robot is supported on its sole leg, namely, 331R or 331L. The road surface contact sensors 361 and the relative movement measurement sensors 362 will be explained later in more detail.

The movement control module 300 controls the whole body concerted movement by the joint actuators 321, 321, 335, 335 in order to realize the behavior commanded by the thinking control module 200. That is, the CPU 311 fetches the behavioral pattern corresponding to the behavior as commanded by the thinking control module 200 from the exterior storage device 314 or internally generates a movement pattern. The CPU 311 also sets the foot movement, ZMP (zero moment point) trajectory, body trunk movement, upper limb movement, and the horizontal waist position and height, in accordance with the specified behavioral pattern, while sending command values specifying the movements conforming to the as-set contents to the respective joint actuators. Meanwhile, the ZMP means a point on the road surface where the moment by the reaction to the walking from the road surface is zero, while the ZMP trajectory means the trajectory along which the ZMP moves during e.g., the walking period of the robot 100.

The CPU 311 is able to adaptively control the whole body concerted movement of the legged mobile robot 100 by detecting the orientation or tilt of the body trunk part of the robot 100 by output signals of the orientation sensor 351 and by detecting whether the respective movable legs are in the free state or in the erected state by output signals of the road surface contact sensors 361 of the left and right legs.

In the legged mobile robot 100 of the present invention, the CPU 311 is able to perform adaptive movement control based on the amount of slip detected or measured by the relative movement measurement sensors 362 of the respective legs. An instance of the adaptive control is the dynamic correction of the target trajectory as scheduled at the outset. The operational control derived from the measured results of the amount of relative movements of the legs will be explained later in more detail.

The thinking control module 200 and the movement control module 300 are constructed on a common platform and are interconnected through bus interface 201 and 301, as shown in FIG. 10. The movement control module 300 is adapted for returning the information indicating to which extent the movements corresponding to the will as determined by the thinking control module 200 have been realized, that is the status of processing, to the thinking control module 200.

Figure 11:
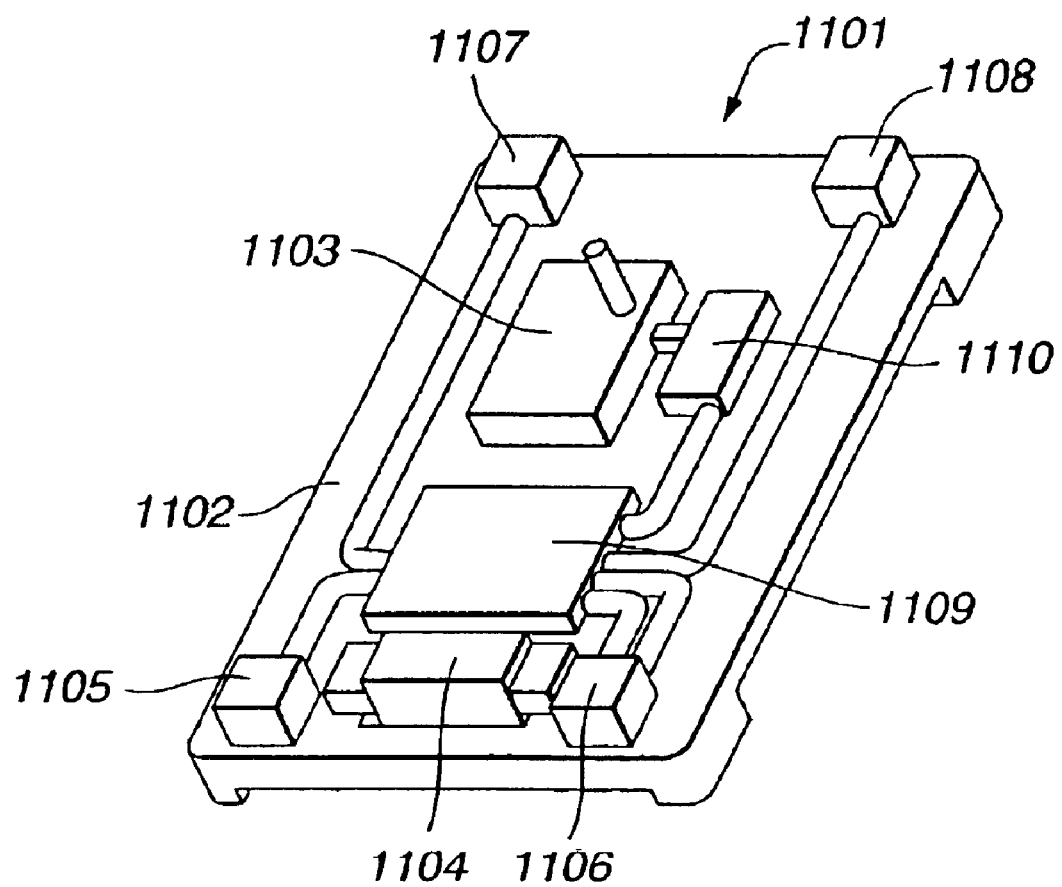
FIG. 11 is a perspective view showing an illustrative structure of the foot sole of the legged mobile robot according to the present invention.

FIG. 11 shows an illustrative structure of the foot sole of the legged mobile robot 100 according to the present invention. Referring to FIG. 11, a leg 1101 is made up of a foot frame 1102, for maintaining the shape of the foot shape, a leg connecting portion 1103 for being electrically and mechanically connected to the leg, a relative movement measurement sensor 1104 for detecting and measuring the amount of the relative movement (amount of slip) of the foot relative to the road surface, road surface contact sensors 1105 to 1108 for detecting each foot sole clearing and reaching the road surface, a sensor input processing calculating unit 1109 for processing the detected signals of the sensors 1105 to 1108, and a sensor information communication processing unit 1110 for transferring the results of the processing calculations to the movement control module 300 as the central control system of the robot 100.

In the embodiment shown in FIG. 11, the four road surface contacting sensors 1105 to 1108 are provided in each foot sole. This is merely illustrative, such that, if desired to confirm touching the ground in more sites, five or more ground touching sensors may be loaded, whereas, if it is sufficient to confirm only a specified site, only one ground touching sensor suffices.

There is similarly no limitation to the number of the relative movement measurement sensors. In the embodiment of FIG. 11, the detection signals of the respective sensors are processed once in a sensor input processing calculating unit 1109 on the same foot sole and the processed results are transferred to the movement processing may directly be sent to the movement control module 300. In this case, the sensor input processing calculating unit 1109 may be dispensed with.

The method for utilizing the result of detection of the amount of relative movement (amount of slip) by the relative movement measurement sensor 1104 is hereinafter explained.

During the time the legged mobile robot 100 is doing operations on legs including, of course, walking, the sensor input processing calculating unit 1109 is perpetually monitoring the ground touching state of respective sites of the legs with the road surface, using the road surface contacting sensors 1105 to 1108. During the time the ground touching is being confirmed by part or all of the road surface contacting sensors 1105 to 1108, the magnitude of movement as measured by the relative movement measurement sensor 1104 is utilized, as the amount of the relative movement in the broad sense of the term. The method of utilizing the results of measurement by the relative movement measurement sensor 1104 is changed depending on the state of the walking being scheduled or the ground touching state.

As a simple case, the state of the ground touching of the erected leg during normal walking is taken for explanation. It is assumed that the foot of the erected leg (left leg 2004 in FIG. 5) is moved relative to the road surface in the roll axis direction and in the pitch axis direction by $\Delta X$ and $\Delta Y$, respectively. Since the robot is supported only by the left leg, it would be ideal if no relative movement occurs with respect to the scheduled trajectory.

Figure 5:
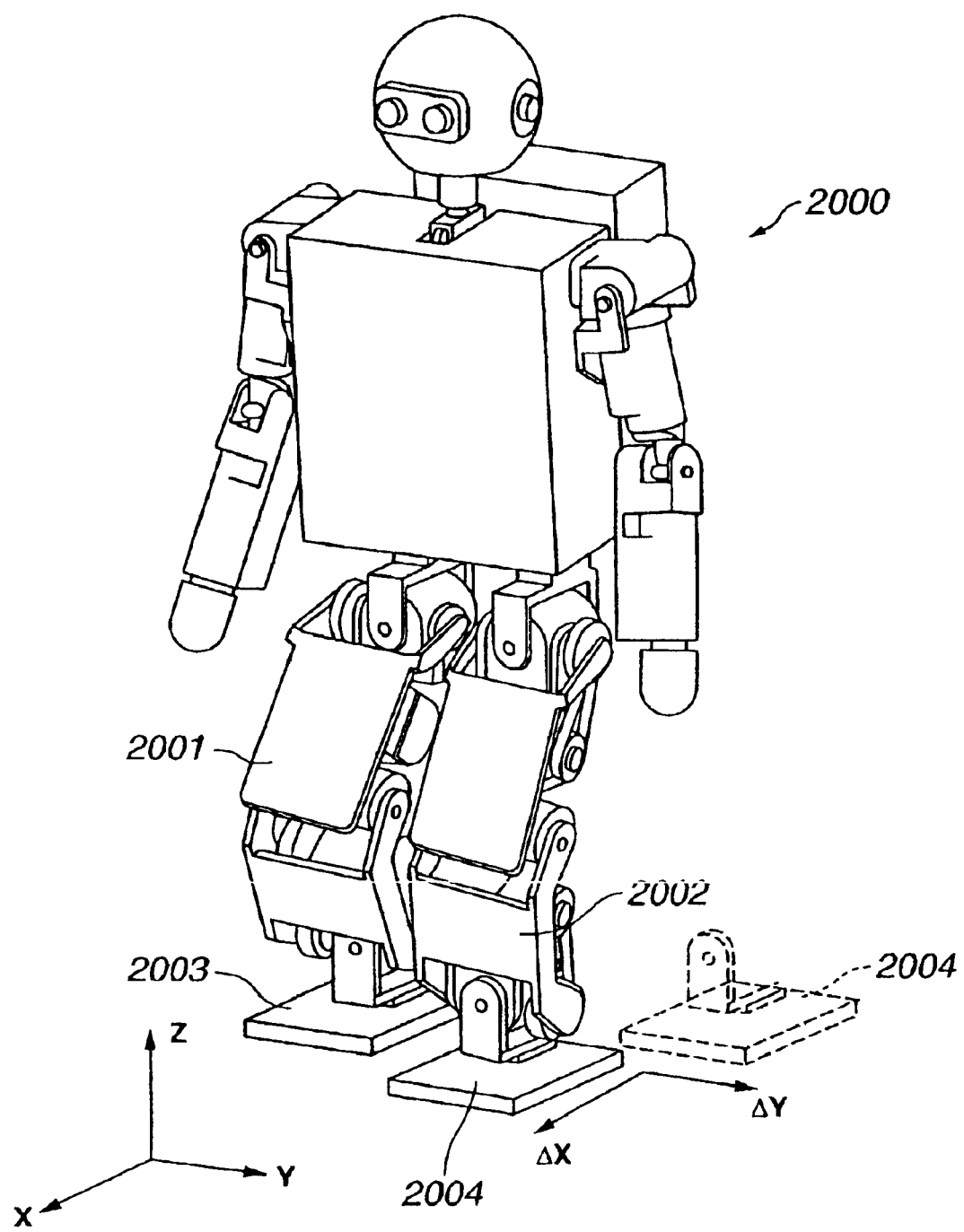
FIG. 5 is a perspective view showing the state in which the left leg has been moved (slipped) relatove th the road surface during the time period when the robot is supported on only the left leg.
Figure 6:
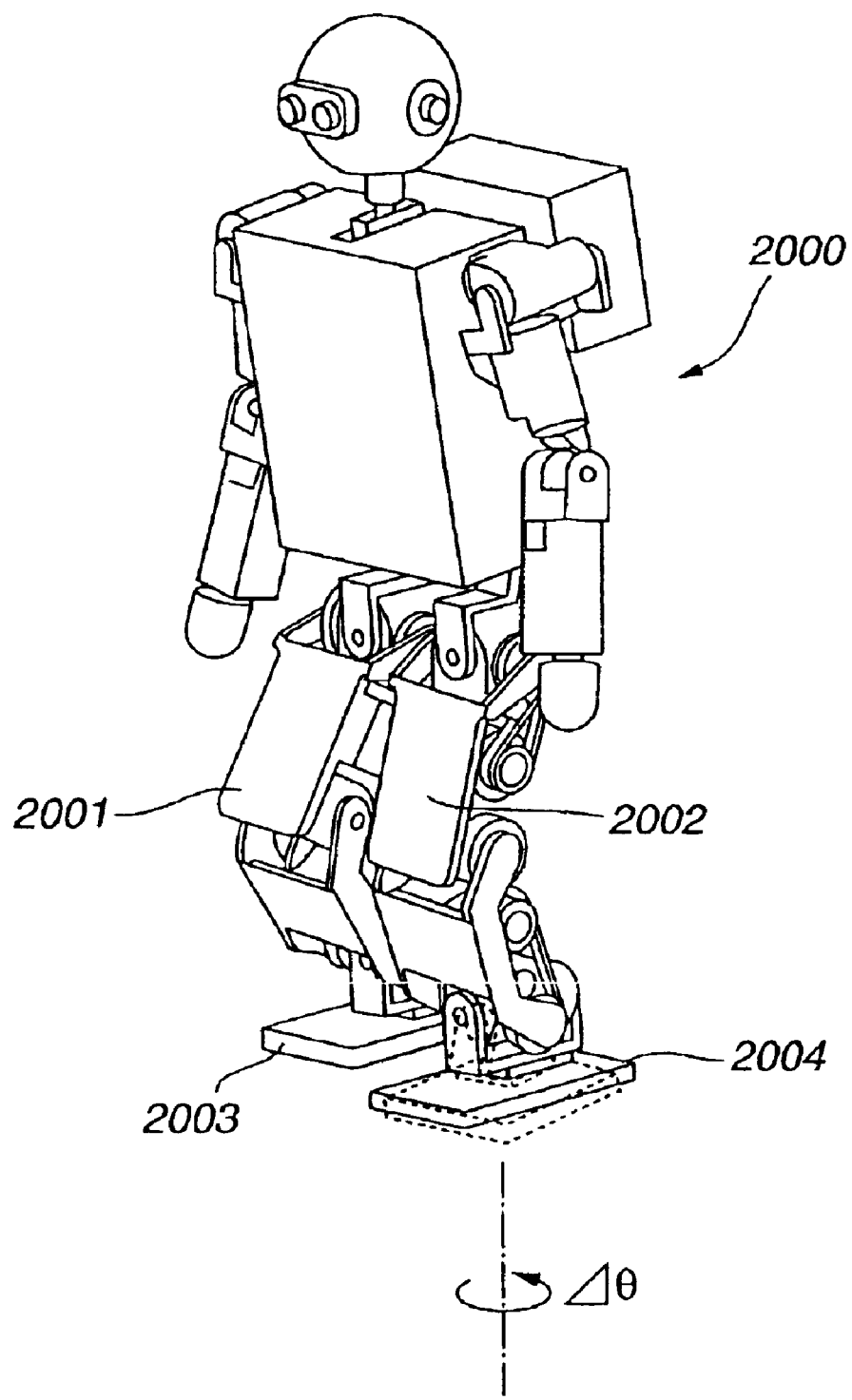
FIG. 6 is a perspective view showing the state in which the relative movement (slip) has produced in which the left leg of the legged mobile robot is rotated around the normal line drawn from the road surface (yaw axis) during the time period when the robot is supported on only the left leg.

The state shown in FIG. 5 is the state in which the left leg 2004 is scheduled to contact the road surface completely. The ground touching state of the leg is confirmed based on the detection signals by the road surface contacting sensors 1105 to 1108. The relative movement measurement sensor 1104 detects the amount of the relative movement $\Delta X$ and $\Delta Y$ in this state.

The detection signals of the road surface contacting sensors 1105 to 1108 and the relative movement measurement sensor 1104 are input to the sensor input processing calculating unit 1109, which then executes calculations on the sensor inputs to construe that relative movement has occurred on the foot touching the gound under a state in which such relative movement inherently should not take place. The sensor information communication processing unit 1110 transmits the results of the processing and calculations to the movement control module 300.

The movement control module 300 then is able to grasp that the legged mobile robot 100 is subjected to relative movement, that is slip, in the roll axis direction and in the pitch axis direction, by ΔX and ΔY, respectively, from the scheduled trajectory. These detected results can be reflected in the next following movement schedule and trajectory correction.

It is assumed that the robot is being supported by both legs, with the right leg 2003 now touching the ground. It is also assumed that, when the left leg 2002 descends to touch the ground, the left leg 2004 has been subjected to relative movement (slip) with respect to the road surface of the left leg 2004. Since the robot (the movement control module 300) comprehends the positions of the respective joints, it is able to detect that the leg is subjected to relative movement such that the relation between the left and right legs has deviated from the trajectory schedule. However, but for the device adapted for directly detecting and measuring the relative movement relative to the road surface, it cannot be ascertained which of the left and right legs is responsible for the relative movement relative to the road surface, while it is impossible to measure the amount of the relative movement accurately quantitatively. In the configuration of the present invention, the relative movement (slip) of the left and right legs relative to the road surface can be observed by the road surface contacting sensors 1105 mounted on the legs, while the recognition of the robot position with respect to the road surface can be improved appreciably in accuracy.

A specified structure of the relative movement measurement sensor 1104 is hereinafter explained.

Figure 12:
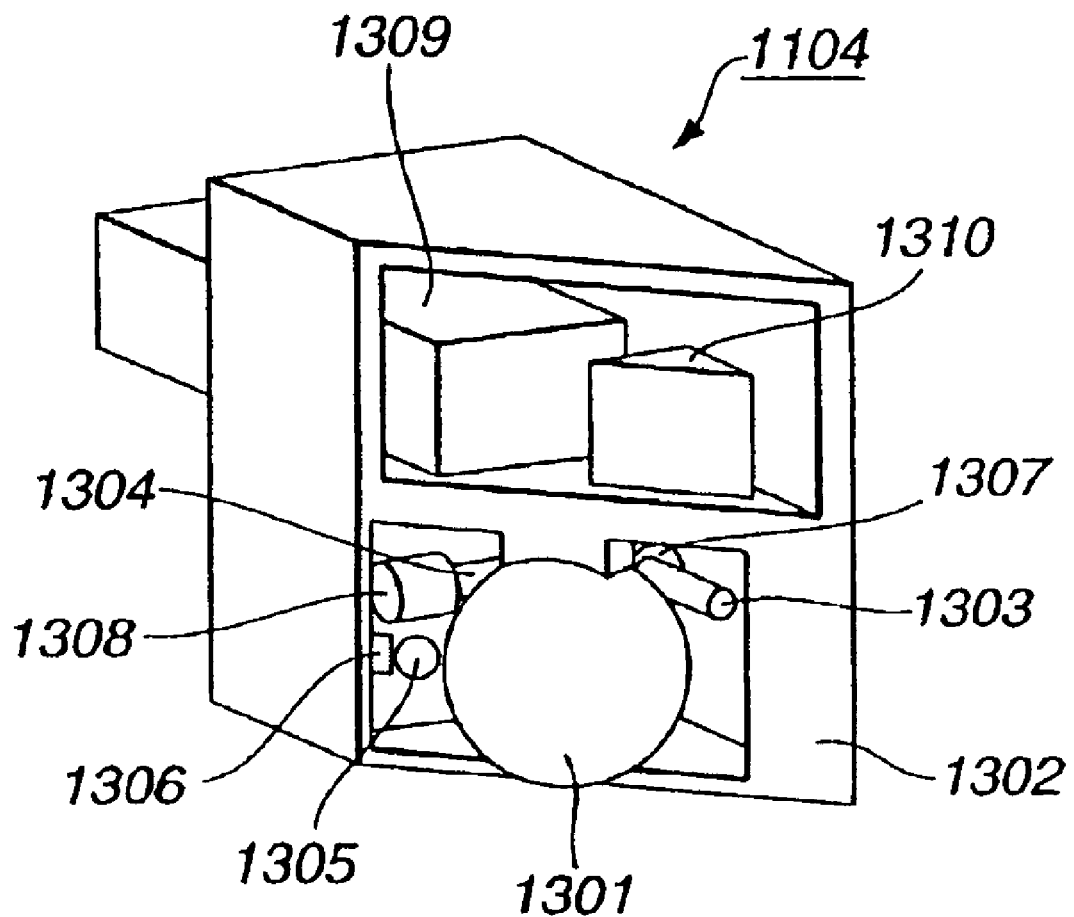
FIG. 12 is a perspective view showing an illustrative structure of a relative movement measurement sensor capable of measuring the relative movement of the foot relative to a direction parallel to the road surface.

FIG. 12 shows a specified structure of the relative movement measurement sensor 1104 applicable to the legged mobile robot 100 of the present invention. The sensor 1104, shown in FIG. 12, is able to detect the relative movement based on the amount of rotation of a ball 1301.

On the foot sole, the ball 1301 is mounted for rotation, with the ball surface being exposed partially to outside. When the foot approaches to the road surface sufficiently, the exposed surface of the ball 1301 is able to contact the road surface.

The ball 1301 is housed within a sensor casing 1302 as its rotation is allowed. On the surface of the ball 1301, an X-axis roll 1303, rotated in unison with the rotation along the X-axis (roll axis) and a Y-axis roll 1304, rotated in-unison with the rotation along the Y-axis (pitch axis) are abutted, as is a roll 1305 for pressing the ball 1301 with a moderate pressure against the rolls 1303, 1304 under the force of restoration of a spring 1306. To the root of the X-axis roll 1303 is directly coupled an X-axis rotary encoder 1307 for detecting the amount of rotation of the roll 1303. Similarly, a Y-axis direction rotary encoder 1308 for detecting the amount of rotation of the Y-axis roll 1304 is directly coupled to the roll 1304.

If, during the time period the leg is touching the ground, the leg is subjected to relative movement (slip) with respect to the road surface, the ball 1301 is rotated in the X-axis and Y-axis directions in amounts corresponding to the amount of the relative rotation. The X-axis component and the Y-axis component of the rotation of the ball 1301 are transmitted by the rolls 1301 and 1304, respectively, while the respective amounts of rotation are read out by the X-axis rotary encoder 1307 and the Y-axis direction rotary encoder 1308, respectively.

In FIG. 12, a module denoted by a reference numeral 1309 is a counter for counting outputs of the respective encoders 1307, 1308, while a module denoted by a reference numeral 1310 is a calculation processor for interpreting an encoder output to calculate the distances traversed in the X-axis and Y-axis directions. Data on the distances traversed by the legs, thus produced, are sent to the sensor input processing calculating unit 1109 and thence transferred through the sensor information communication processing unit 1110 to the movement control module 300.

Figure 13:
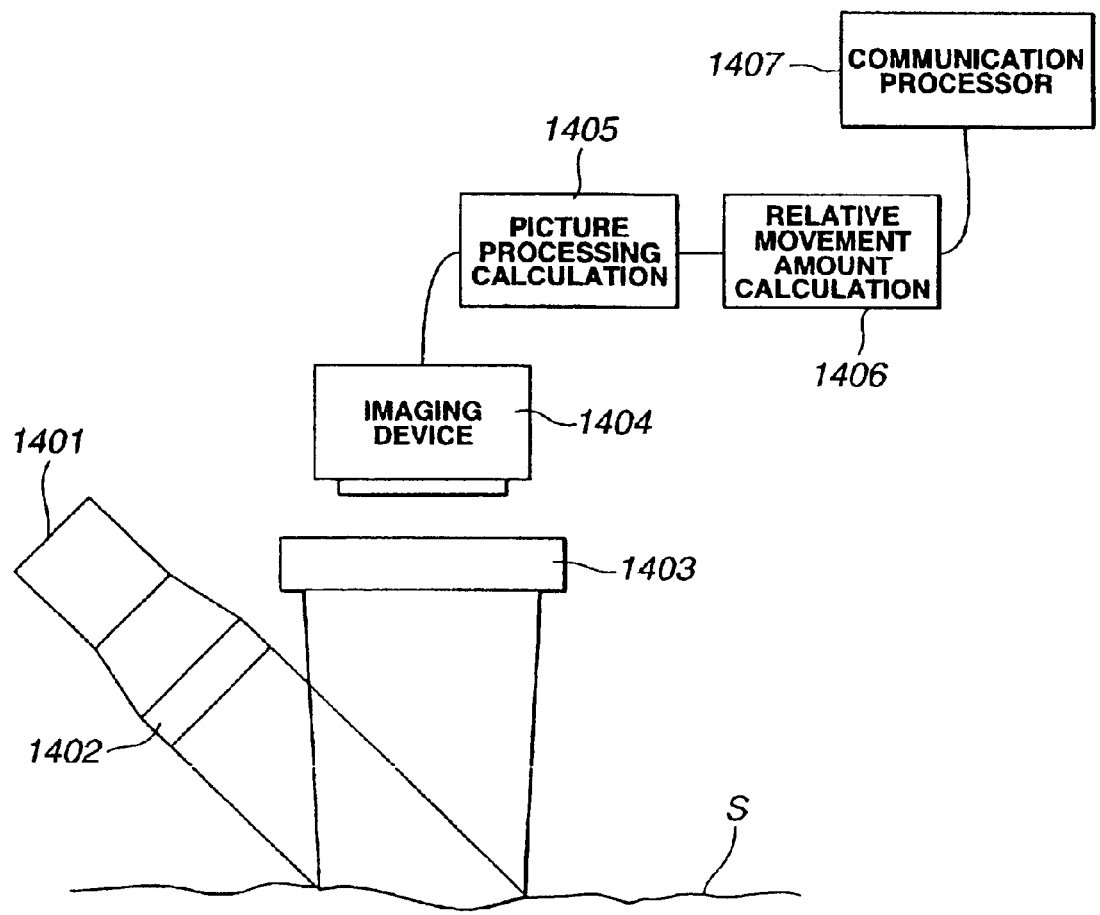
FIG. 13 is a perspective view showing another illustrative structure of a relative movement measurement sensor capable of measuring the relative movement of the foot relative to a direction parallel to the road surface.

FIG. 13 shows another illustrative structure of the relative movement measurement sensor 1104, while a relative movement measurement sensor 1104 shown in FIG. 13 is adapted for optically reading the amount of the relative movement.

In FIG. 13, the relative movement measurement sensor 1104 of the embodiment shown therein is made up of a light emitting unit 1401, as an illuminating light source, a light emitting lens unit 1402, comprised of optical components, such as lenses, for collecting the illuminated light, an imaging lens unit 1403, comprised of optical components, such as lenses, for collecting the reflected light from the road surface S, an imaging unit 1404 for imaging the reflected light, an image processing calculating unit 1405 for processing the image, a relative movement amount processor 1406 for determining the amount of relative movement between the foot and the road surface based on the result of image processing, and a communication processor 1407 for transferring the so decided amount of the relative movement (slip) to the movement control module 300 as the central processing system of the robot 100.

In the embodiment of FIG. 13, the image obtained by the imaging unit 1404 is processed at the legs to calculate the amount of relative movement. Alternatively, the image produced may directly be transferred to the movement control module 300, in which case the image processing calculating unit 1405 and the relative movement amount processor 1406 can be omitted from the foot.

The illuminated light of the preset wavelength, generated by the light emitting unit 1401, is illuminated to the vicinity of a road surface position touched by the foot. The reflected light from the road surface under this illumination is collected by the imaging lens unit 1403 to form an image on the imaging surface of the imaging unit 1404.

The imaging unit 1404 is formed by e.g., a CCD (charge-coupled device) and is adapted for receiving the light reflected from the road surface to form an image conforming to minute crests and recesses or patterns on the road surface. Alternatively, such a pattern which has high view ability may be provided at the outset on the road surface.

The image processing calculating unit 1405 is fed from the imaging unit 1404 to compare the images at minute time intervals to calculate the image movements. For example, difference may be taken of the images produced at intervals of Δt second as shown in FIG. 14 to statistically process the amounts of movement Δd1 between corresponding crests and recesses or patterns to calculate the image movements.

The image movement data, obtained at the image processing calculating unit 1405, is output to the relative movement amount processor 1406 on the downstream side. Based on the image movement, the relative movement amount processor 1406 calculates the amounts of the relative movement (slip) ΔX and ΔY in the X-axis (roll axis) direction and in the Y-axis (pitch axis) direction with respect to the road surface. The so calculated amounts of the relative movement are transferred by the communication processor 1407 to the movement control module 300.

The relative movement measurement sensor 1104, shown in FIGS. 12 and 13, calculate the amounts of relative movements of the foot with respect to a surface parallel to the road surface, that is amounts of relative movements (slip) X and Y in the X-axis direction (roll axis direction) and in the Y-axis direction (pitch axis direction). However, the amount of relative movement around a normal of the road surface, as well as the amount of relative movement in the direction parallel to the road surface, is crucial in movement control or trajectory correction of the legged mobile robot 100, as discussed above. The relative movement measurement sensor, capable of measuring the amount of relative movement (slip) around the normal line from the road surface, is hereinafter explained.

Conventionally, the movement of the mobile robot around the normal line from the road surface is routinely measured using a gyro sensor. However, this presented problems in e.g., measurement accuracy. On the other hand, the relative movement around the normal line affects the walking direction significantly, so that more accurate measurement is desirable.

Figure 15:
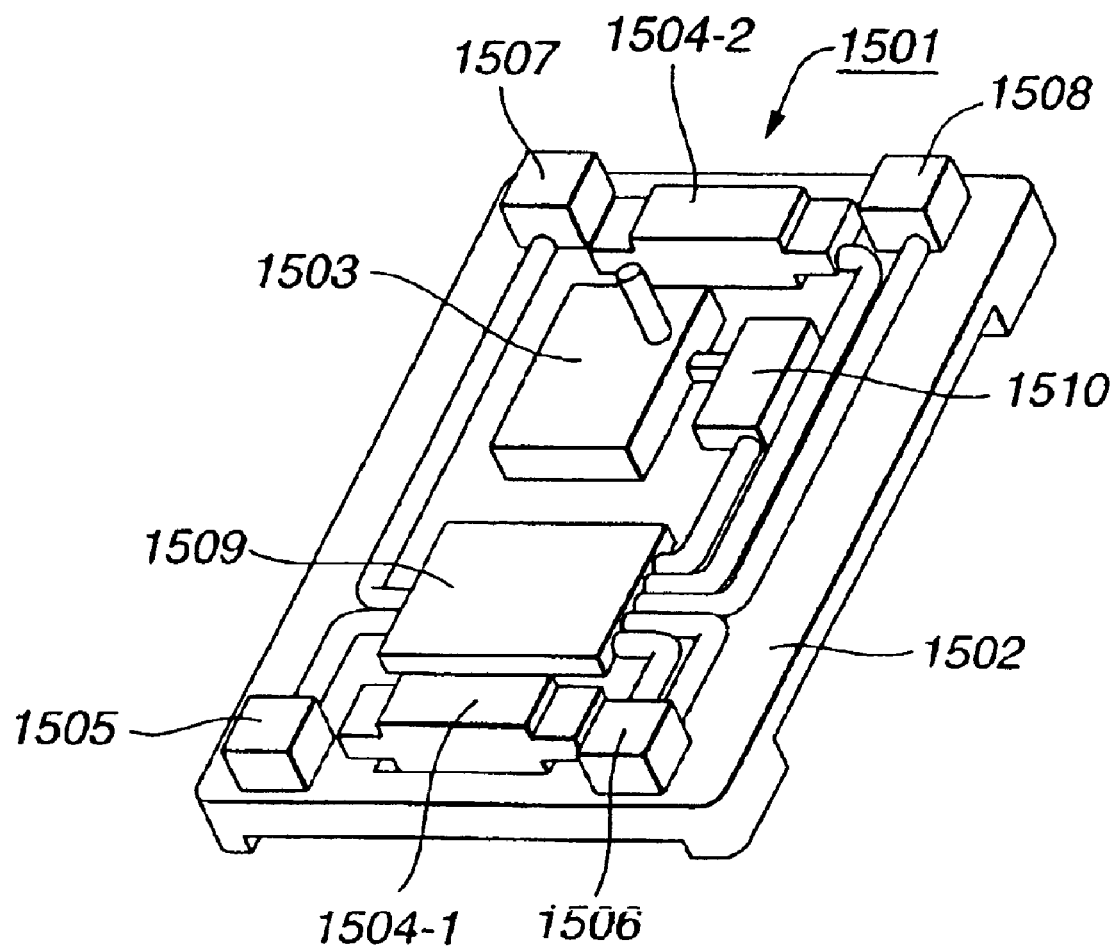
FIG. 15 is a perspective view showing an illustrative structure of a relative movement measurement sensor capable of measuring the relative movement around a normal line drawn from the road surface of the foot sole.

FIG. 15 illustrates an illustrative structure of a foot carrying a relative movement measurement sensor capable of measuring the amount of relative movement around a normal of the road surface.

As shown therein, the foot 1501 includes a foot frame 1502 for mainitaing the shape of the foot, a leg coupling unit 1503 for electrically and mechanically connecting the foot to the associated leg, two relative movement measurement sensors 1504-1 and 1504-2, mounted at a preset distance from each other on the foot sole of the foot, road surface touching sensors 1505 to 1508 for sensing each foot sole clearing and touching the road surface, a sensor input processing calculating unit 1509 for processing; detection signals of the respective sensors, and a sensor information control processor 1510 for transmitting the result of the processing calculations to the movement control module 300 as the central processing system of the robot 100.

The four road surface touching sensors 1505 to 1508 may be of the identical structure as the embodiment shown in FIG. 11, there being no limitation to the number or mounting sites of the sensors.

It is sufficient if the relative movement measurement sensors 1504-1 and 1504-2 are each capable of measuring the amount of relative movement in a direction parallel to the road surface, such that the relative movement measurement sensor 1104 shown in FIG. 12 or 13 may directly be used.

The scheme of measuring the amount of relative movement (slip) of the foot around the line normal from the road surface using the two relative movement measurement sensors 1504-1 and 1504-2 is hereinafter explained.

If the foot 1501 is subjected to relative movement (slip) with respect to the road surface, the respective relative movement measurement sensors 1504-1 and 1504-2 calculate the amount of the relative movement in a direction parallel to the road surface every preset minute time interval. The amounts of the relative movement, as calculated, are as shown in FIG. 16.

Figure 16:
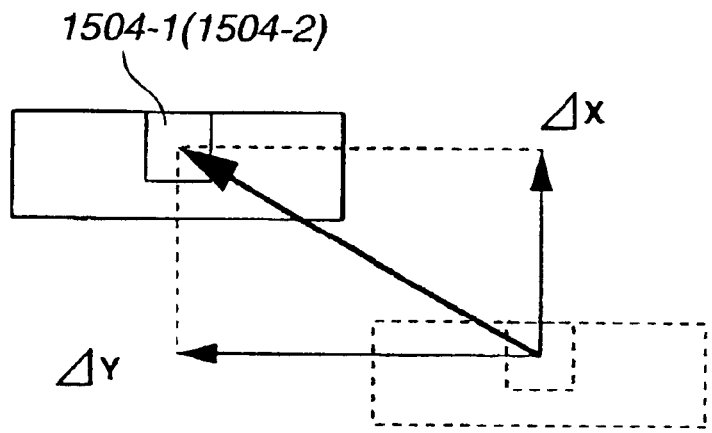
FIG. 16 shows the amounts of relative movement at minute time intervals in a driection paralle to the road surface in the foot as calculated in each relative movement measurement sensor
Figure 17:
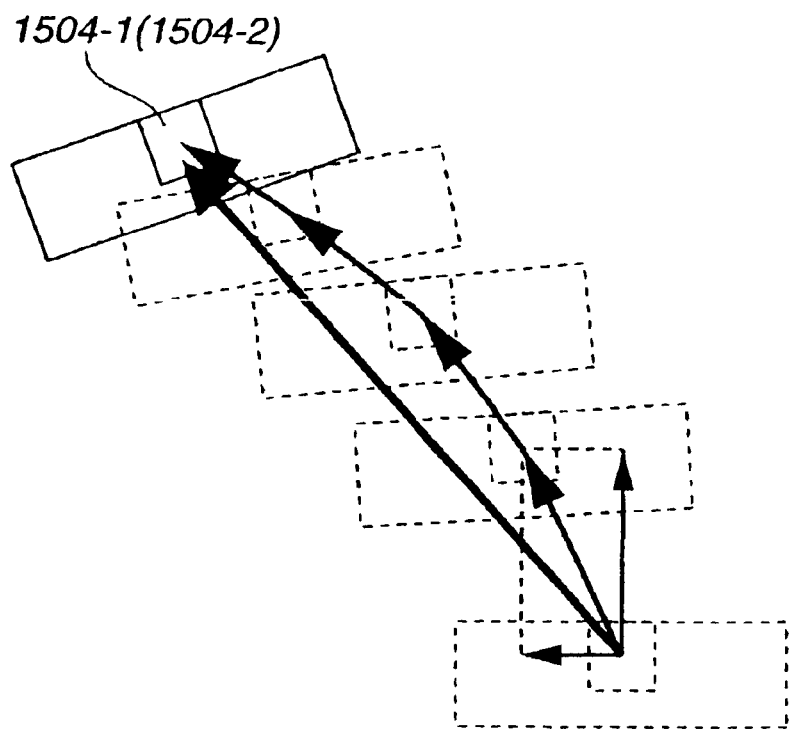
FIG. 17 shows the manner of finding the amount of relative movement around a normal line drawn from the road surface by chronologically interconnecting the amounts of relative movement in the direction parallel to the road surface as measured at minute time intervals.
Figure 18:
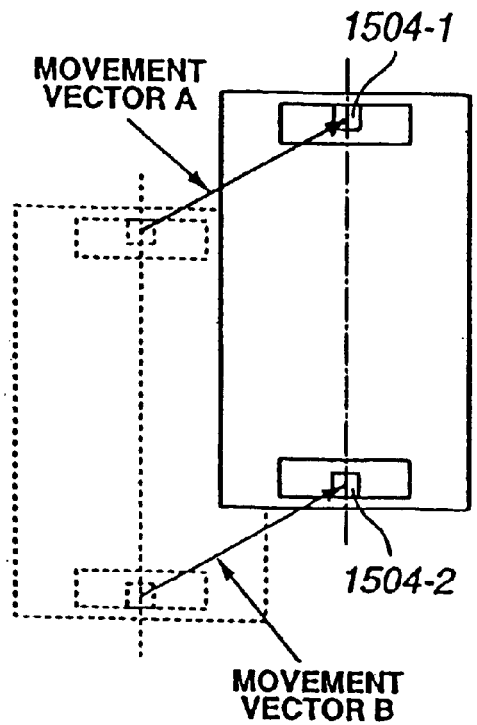
FIG. 18 schematically shows the measured results by the relative movement measurement sensor in case the relative movement of the foot sole relative to the road surface does not contain components around a normal line drawn from the road surface.

By repeating the measurement of the amounts of the relative movement every preset minute time interval, such as is shown in FIG. 16, and by chronologically joining the measured results, the amounts of the relative movement around the normal line from the road surface can be measured, as shown in FIG. 17.

In the illustrative structure of the foot 1501, shown in FIG. 15, in which the two relative movement measurement sensors 1504-1 and 1504-2 are spaced apart from each other, the amounts of the relative movement in the direction parallel to the road surface can be measured at two points.

Should the relative movement of the foot 1501 relative to the road surface be free of components around a normal of the road surface, the relative movements in the mounting sites of the sensors 1504-1 and 1504-2 are parallel to each other, so that the components in the X and Y directions as measured by the respective relative movement measurement sensors 1504-1 and 1504-2 are totally coincident with each other. That is, detection outputs of the respective sensors are of the same value.

Figure 19:
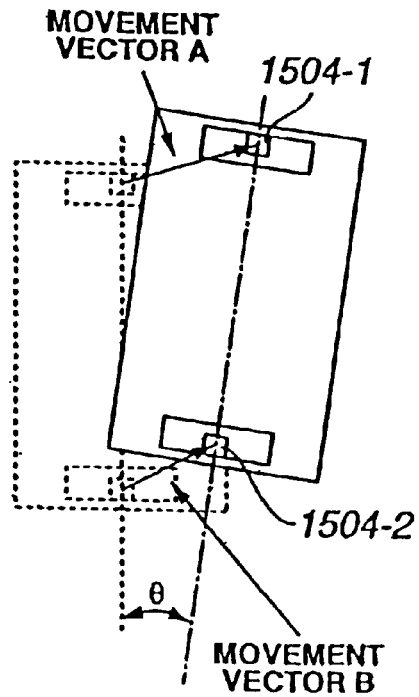
FIG. 19 schematically shows the measured results by the relative movement measurement sensor in case the relative movement of the foot sole relative to the road surface contains components around a normal line drawn from the road surface.

On the other hand, should the relative movement of the foot 1501 relative to the road surface contain components around a normal of the road surface, the components in the X and Y directions as measured by the respective relative movement measurement sensors 1504-1 and 1504-2 are not coincident with each other. FIG. 19 illustrates the state in which the foot 1501 has performed relative movement around a normal of the road surface by an angle θ every preset time interval. In this case, movement vectors A, B, defined by the amounts of relative movements, as measured by the relative movement measurement sensors 1504-1 and 1504-2, are not parallel to each other. That is, the amount of rotation θ around the normal line from the road surface of the foot can be calculated based on an angle between these movement vectors A and B.

In the embodiment shown in FIG. 15, two relative movement measurement sensors are loaded on the foot part. However, the amounts of the relative movement relative to a normal line from the road surface can, of course, be measured in similar manner using three or more relative movement measurement sensors. If a larger number of the relative movement measurement sensors are used, it is possible to eliminate variations in the measurement sensitivity of the respective sensors and in the characteristics of the other, sensors to enable more accurate measurement of the amounts of the relative movements.

Of course, similar operation and results can be realized with the present invention by employing a sensor capable of directly measuring the amounts of the rotation around the normal line drawn from the road surface instead of or in addition to calculating the amounts of the relative rotation around a normal of the road surface based on the amounts of the relative movements in the direction parallel to the road surface.

With the legged mobile robot 100 of the present invention, as described above, the amounts of the relative movements of the foot part relative to the road surface can be measured directly and accurately. Based on these results of measurement, occurrence of statuses not encompassed by the trajectory schedule in the movement operations of the robot 100 erected on legs can be recognized more promptly and reflected adaptively and quickly in the ensuing behavioral schedule.

For example, if the foot part slips, the relative movement measurement sensors mounted on the foot part respond more speedily than the orientation sensors mounted on the waist or body trunk of the robot 100, in a manner more favorable for correcting the behavioral schedule. Moreover, if the robot has intruded to a more slippery road surface portion, the risk ascribable to slip can be predicted before the orientation of the robot becomes unstable.

In addition, the load imposed on other measurement systems loaded on the robot 100 can be moderated or removed by directly measuring the amounts of the relative movements between the foot part and the road surface. For example, the degree of precision required of a gyro sensor may be moderated, while it becomes unnecessary to perform highly complex calculation processing on an input image from e.g. a camera.

The measured results of the amounts of the relative movements between the foot part and the road surface can be reflected on the subsequent movement schedule of the legged mobile robot 100, as now explained.

FIGS. 20A to 20D illustrate four modes of getting the measured results of the relative movements between the foot part and the road surface reflected on the subsequent movement schedule during walking of the legged mobile robot 100.

Figure 20:
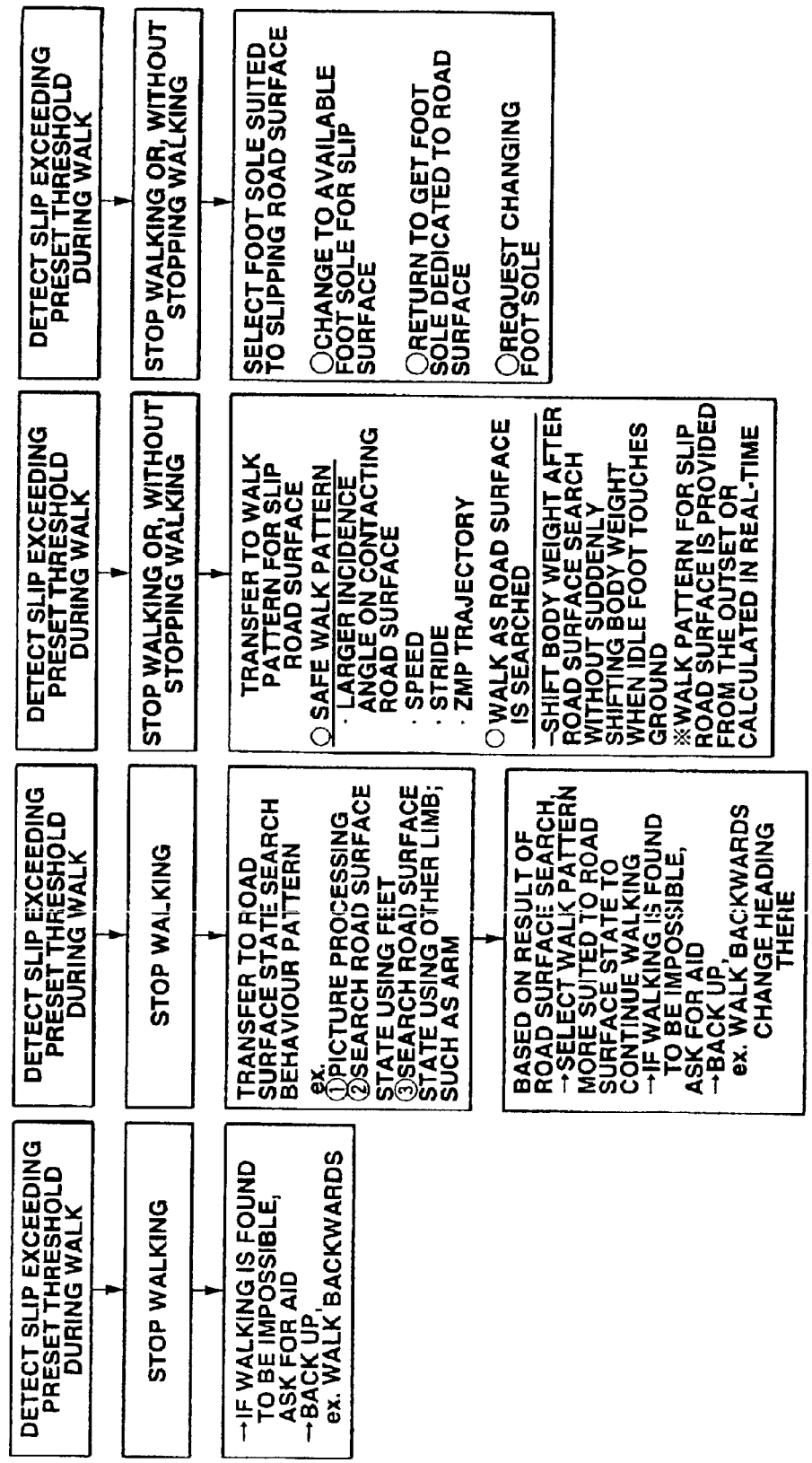
FIGS. 20A to 20D show the manner in which the measured results of the amounts of relative movement between the foot and the road surface during walking of the legged mobile robot are reflected on the subsequent behavioral schedule.

Of these, the modes shown in FIGS. 20A and 20B are common in transiently stopping the walking movements.

In FIG. 20A, if the movement control module 300 has detected slipping exceeding a preset threshold value, it transiently halts the walking movement, while advising the thinking control module 200 that extreme slipping has been detected. The thinking control module 200 is responsive thereto to express the risky situation by a human-like behavior. For example, if walking disabled states are detected, the thinking control module 200 calls for assistance to a near-by user. For example, a request for assistance is realized by uttering the speech or by exploiting wireless communication. Alternatively, the robot 100 autonomously veers or backs up.

In FIG. 20B, if the movement control module 300 detects the slipping exceeding a preset threshold value, it transiently halts the walking movement at the same time as it transfers to a road state search behavior routine.

There is no particular limitation to the road state search behavior routine For example, an input image from an image input device 251, such as a camera, may be processed to verify the states of the road surface from the texture or pattern. Alternatively, a foot part, such as a tiptoe, may be used to apply an operation of scratching the road surface of verify the states of the road surface. Still alternatively, other body parts than the foot part, such as arm, may be used to apply an operation of scratching the road surface of verify the states of the road surface.

Then, a proper action is taken based on the results of road surface state search. Typical of the proper action is selecting a walking pattern suited to the road surface states to continue the walking. Meanwhile, the walking pattern for a slippery road may be computed off-line and stored at the outset in an exterior storage device 314 or generated in real-time on the movement control module 300. The generation of a walking pattern will be explained subsequently in more detail.

Also typical of the proper action on verifying the walking disabled state is expressing the risky situation by a human-like operation, such as calling for assistance to a near-by user. Similarly typical of the proper action is returning to the original safe road surface site by backing up or veering. In veering, it may be verified whether or not such veering is possible.

In the mode of FIG. 20C, the transition to the walking pattern for a slippery road is made with the walking movement being not halted or being halted transiently.

The walking pattern for a slippery road is classified into a safe walking pattern or to walking as the road surface is searched.

Figure 21:
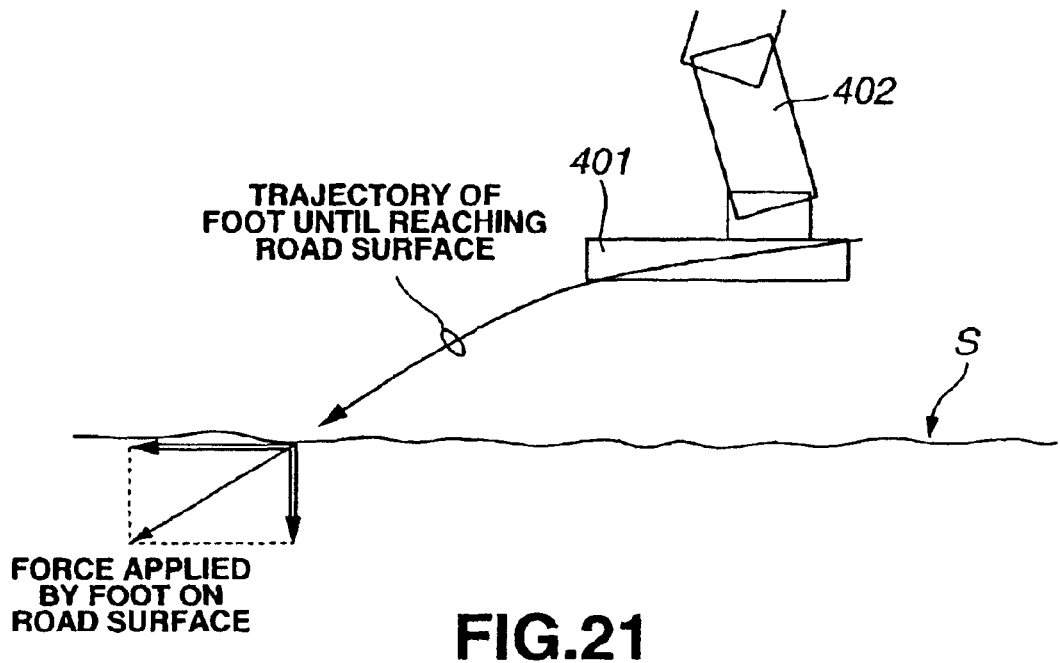
FIG. 21 shows the operation of the foot contacting the road surface in case of the small angle of incidence of the foot on the road surface.
Figure 22:
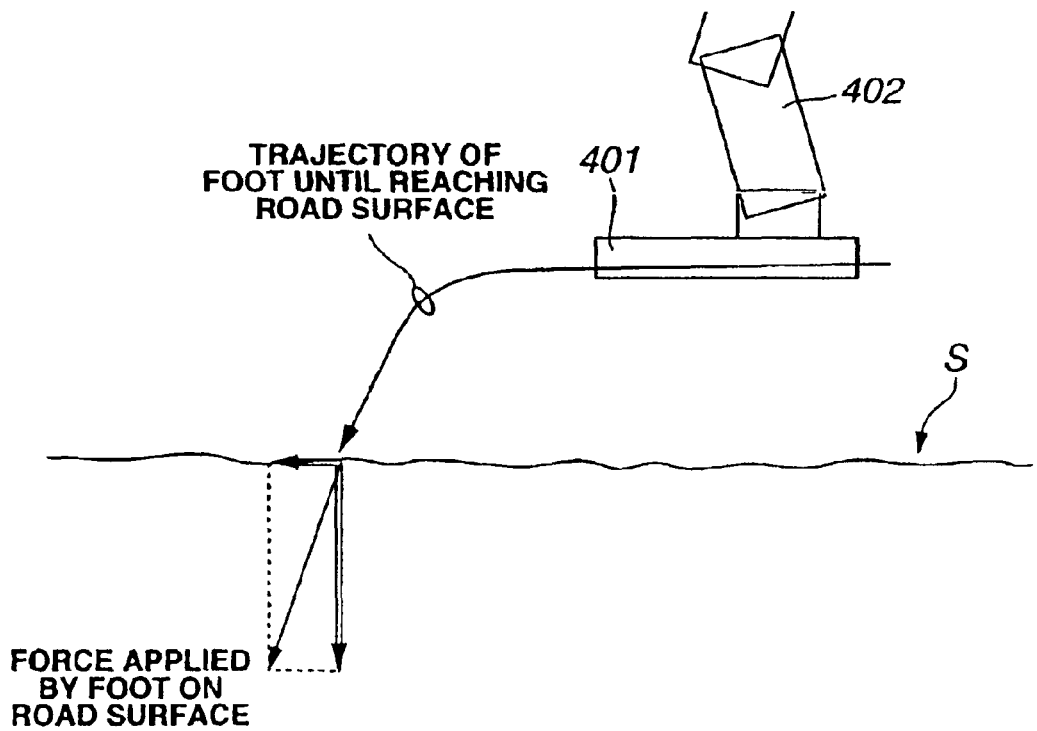
FIG. 22 shows the operation of the foot contacting the road surface in case of the large angle of incidence of the foot on the road surface.

In the former, that is in the safe walking pattern, the angle of incidence at the time of the foot part touching the road surface may be increased to enhance the frictional resistance between the foot part 401 and the road surface S. FIGS. 21 and 22 depict, from the lateral side of the proceeding direction, the road surface touching operation in case of a small incidence angle of the foot part 401 at the time of the foot part touching the road surface and that in case of a larger incidence angle of the foot part 401 at the time of the foot part touching the road surface, respectively.

In the case of FIG. 21, slip tends to be produced because of the larger horizontal component of the force the leg touching the ground 402 applies to the road surface. In the case of FIG. 22, a smaller horizontal component of the force the leg touching the ground 402 applies to the road surface suffices, so that the slip is less likely to be produced, with the frictional coefficient of the road surface S remaining constant.

Also typical of the safe walking pattern is such a walking pattern in which the walking speed is lowered or the footstep is made smaller to suppress the slip, or in which the ZMP trajectory is corrected. The generation of the safe walking pattern for a slippery road surface will be explained later in more detail.

If the robot is to walk as it searches the road surface, it is sufficient if shifting of the body weight of the robot 100 at the same time as the free foot touches the road surface is evaded, with the shifting of the body weight being made depending on the road surface states following execution of the road surface search operations.

In the mode shown in FIG. 20D, the foot sole suited to the slippery road surface is selected as the walking movement is not halted or is halted transiently.

For example, if the legged mobile robot 100 itself is carrying the foot sole for the slippery ground, it is sufficient to switch between the different foot soles on the site at a shoe changing interval.

If the legged mobile robot 100 itself is not carrying the foot sole, the robot 100 may return to a place where foot soles for slippery road surface or other types of the foot soles are available for example, to a tool magazine.

If the legged mobile robot 100 itself is not carrying the foot sole, the risky situation may also be expressed with a human-like behavior, such as by calling and asking the user to change the foot sole.

The processing for generating the walking pattern for slippery road surfaces, used in FIGS. 20B and 20C, is now explained. In general, the walking pattern may be calculated off-line at the outset or corrected in real-time during walking.

Figure 23:
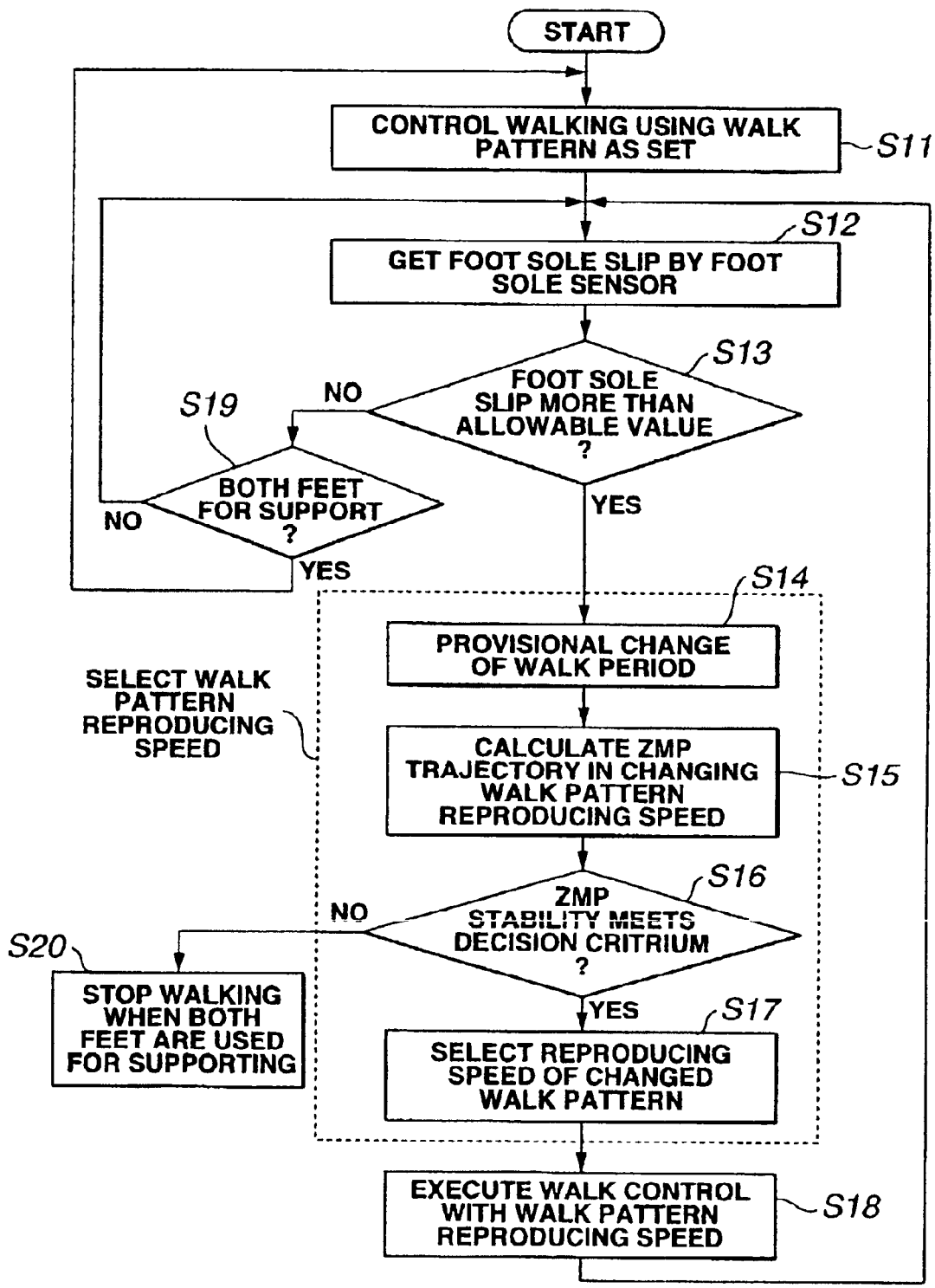
FIG. 23 is a flowchart showing the processing sequence of correcting the walking pattern in real-time on occurrence of the slip on the foot sole.

First, a case in which the walking pattern is to be corrected in real-time on slip occurrence on the foot sole is explained. FIG. 23 shows a flowchart for illustrating the processing sequence in correcting the walking pattern in real-time. The following explanation is made with reference to this flowchart.

First, the walking control is made using a walking pattern as set (step S11). The walking pattern is prescribed by, for example, the walking period $K_c \times C$, where $K_t$ is a multiplication factor having a default value of 1.0, and by a footstep L [s/step].

The foot sole slipping is measured at step S12, using the relative movement measurement sensors, mounted on the foot sole of the foot part, as already explained, to check whether or not the slipping is not less than an allowed value (step S13).

If the foot sole slipping is less than the allowed value, processing reverts to step S11 or to step S12 in case the robot is then supported on both legs or on only one leg, respectively (step S19) to continue the walking using the same walking pattern as set.

If the foot sole slipping exceeds the allowed value, the processing for selecting the reproducing speed of the walking pattern is performed.

In such case, the walking period is provisionally changed (step S14). This may be realized by provisionally increasing the value of the multiplication factor $K_c$ (such as by setting $K_c=K_c+0.1$), as a result of which the reproducing speed of the walking pattern may be changed.

The ZMP trajectory on changing the walking pattern reproducing speed then is calculated (step S15). The method of deriving the ZMP trajectory, that is the ZMP equation, is described in Takanishi et al., "Two-legged walking under unknown external force—development of a walking control system against an unknown external force in the transverse direction" (9th Meeting of Robot Association of Japan, pages 321 to 324).

Based on the so calculated ZMP trajectory, it is then verified whether or not the ZMP stability judgment criterium is met (step S16). If the ZMP stability decision standard is met, the walking pattern reproducing speed as changed is selected (step S17). The walk control is performed in accordance with this reproducing speed (step S18). Then, processing reverts to step S12 to repeat the above processing.

It should be noted that the walk pattern reproducing speed may similarly be achieved not by changing the walking period but by changing the footstep.

If conversely the ZMP stability judgment criterium is not met; the walking may be resigned from its continuation to halt the walking when the robot is supported on both legs at which time the robot 100 may be stabilized in orientation.

Figure 24:
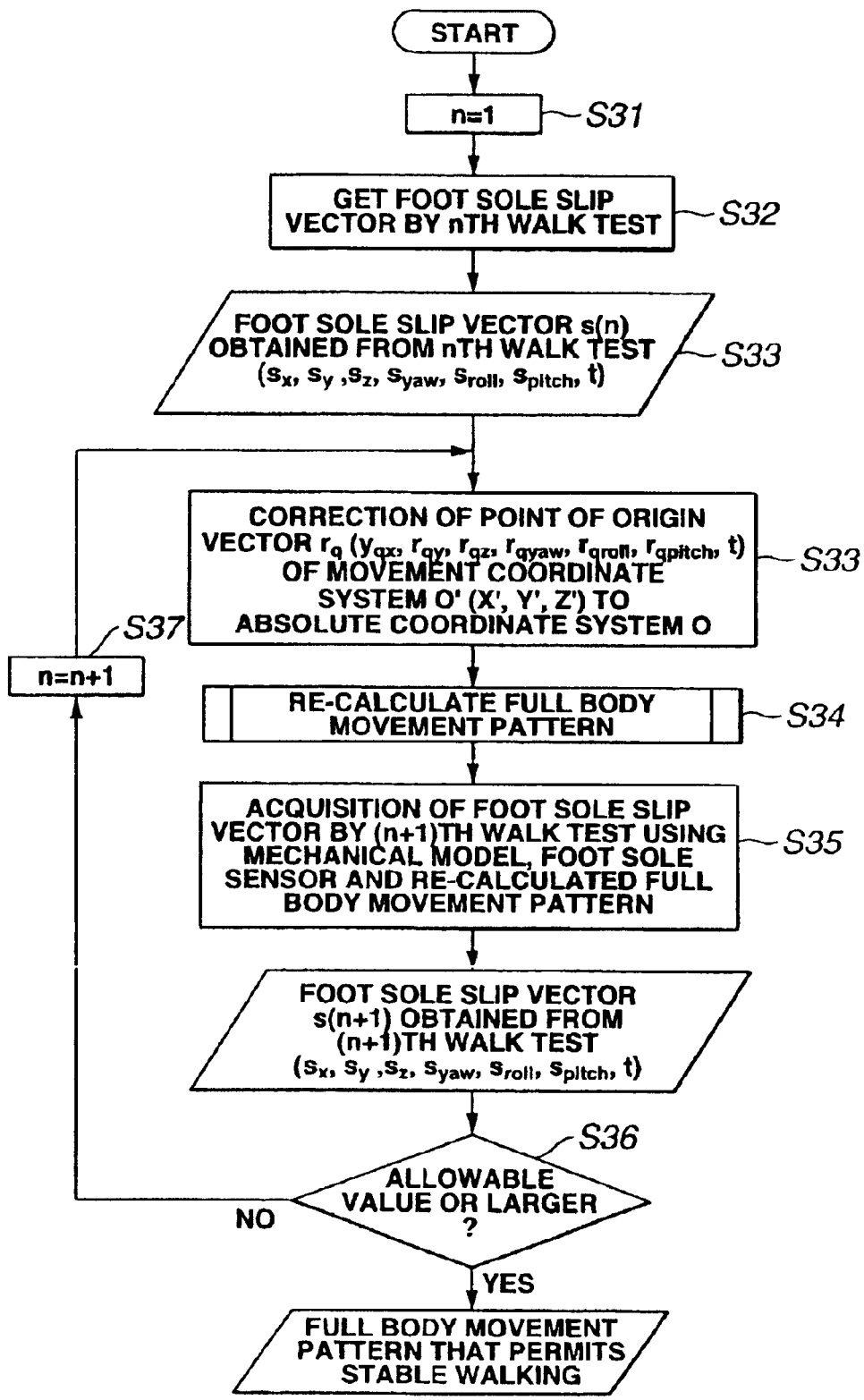
FIG. 24 is a flowchart showing the processing sequence of correcting the walking pattern in off-line on occurrence of the slip on the foot sole.

The processing of generating the walking pattern for slip occurrence on the foot sole part off-line at the outset is now explained. FIG. 24 shows the flowchart showing the processing sequence of generating the walking pattern off-line. The following explanation is based on this flowchart.

First, an initial value 1 is substituted in a variable n (step S31), to acquire a foot sole slip vector s(n) on an nth walking test (step S32).

Using this foot sole slip vector s(n), a vector of a point of origin $r_q$ ($r_{qx}$, $r_{qy}$, $r_{qz}$, $r_{qraw}$, $r_{qroll}$, $r_{qpitch}$, t) of a kinetic coordinate system O'-X'Y'Z' with respect to the absolute coordinate system O of the robot 100 is corrected at step S33. The correction equation is as indicated by the following equation (1):

$$r_q(r_{qx}, r_{qy}, r_{qz}, r_{qraw}, r_{qroll}, r_{qpitch}, t) = r_q(r_{qx}, r_{qy}, r_{qz}, r_{qraw}, r_{qroll}, r_{qpitch}, t) + K \times s(n)(s_x, s_y, s_z, s_{raw}, s_{roll}, s_{pitch}, t) \quad (1)$$

where K is the feedback gain.

Using the so corrected point of origin vector $r_q(r_{qx}, r_{qy}, r_{qz}, t)$, re-calculation of the whole body movement pattern of the legged mobile robot 100 is executed (step S34). The processing for calculating the whole body movement pattern of the legged mobile robot 100 will be explained subsequently.

Using the mechanical model, relative movement measurement sensors and the re-calculated whole body movement pattern, a (n+1)st walk test is conducted to acquire the (n+1)st foot sole slip vector s(n+1) (step S35).

It is then verified at step S36 whether or not the (n+1)st foot sole slip vector s(n+1) is equal to or larger than the allowable value. If the vector is less than the allowed value, the whole body movement pattern as found at step S34 is output as the stable walk enabling pattern when the slip at the foot sole has occurred.

On the other hand, if the foot sole slip vector s(n+1) is equal to or larger than the allowable value, n is incremented by 1 (step S37). Then, processing reverts to step S33 to execute the above processing repeatedly.

Finally, the processing for calculating the whole body movement pattern, executed at step S34 in FIG. 24, is explained.

Figure 25:
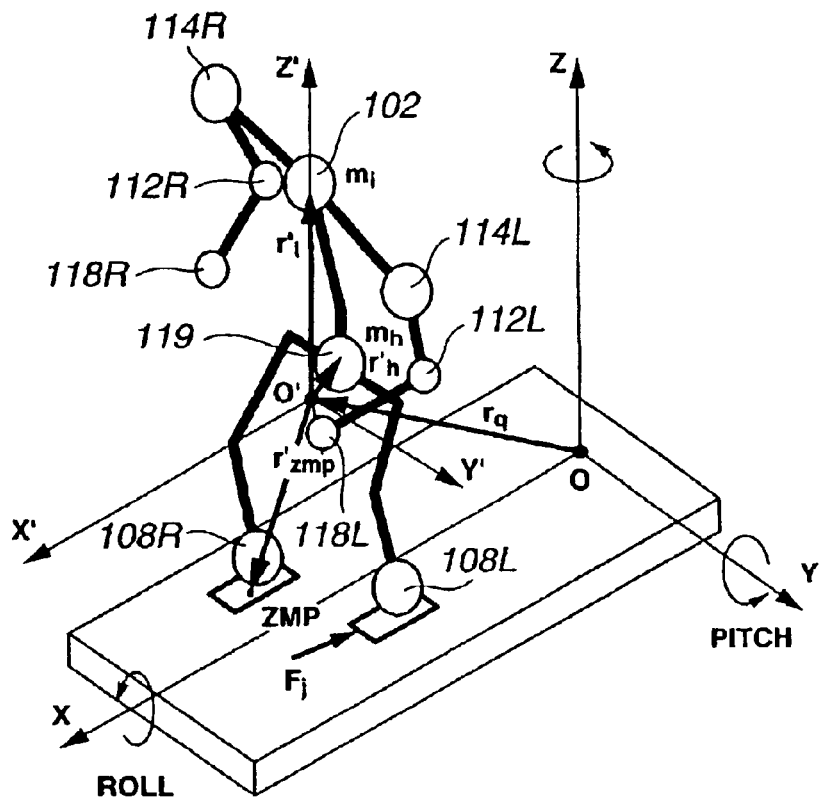
FIG. 25 shows a linear non-interferencing multi mass point approximating model of a legged mobile robot 100, introduced for calculating the walking control according to the present invention.

In the present embodiment, a linear non-interference multi mass point approximating model shown in FIG. 25 and as indicated in the equations (2) and (4) is substituted for the legged mobile robot 100 shown in FIGS. 7 to 9 for calculating the whole body movement pattern.

In FIG. 25, the O-XYZ coordinate system indicates roll, pitch and yaw axes in the absolute coordinate system, whereas the O'-X'Y'Z' coordinate system indicates the roll, pitch and yaw axes in a movement coordinate system moved with the legged mobile robot 100. In the multi mass point model, shown in FIG. 25, i, $m_i$ and $r'_i$ denote a subscript afforded to the ith item, the mass of the ith mass point and a position vector of the ith mass point (in the kinematic coordinate system), respectively. The mass and the position vector of a waist mass point, crucial in particular in the processing of generating a pattern of the whole body concerted movement as later explained, are mh and $r'_h$ ($r'_{hx}$, $r'_{hy}$, $r'_{hz}$), respectively, with the position vector of ZMP being $r'_{zmp}$. It is to be understood that, in the non-precise multi mass point approximating model, shown in FIG. 25, the equation of the moment is stated as the linear equation and that the moment does not interference as to the pitch and roll axes.

Such multi mass point approximating model can be generated roughly by the following processing sequence:

(1) The mass distribution of the robot 100 in its entirety is found;

(2) the mass point is set; as for the method for setting the mass point, it does not matter whether the mass point is entered by a manual operation of a designer or automatically in accordance with a preset rule;

(3) the center of gravity is found from one area i to another and the mass $m_i$ as well as the position of the center of gravity is accorded to a mass point in question;

(4) each mass point $m_i$ is represented as a sphere having a center at the mass point position $r_i$ and a radius proportionate to the mass; and (5) the mass points, that is spheres, having a real interconnection relation, are interconnected.

Figure 26:
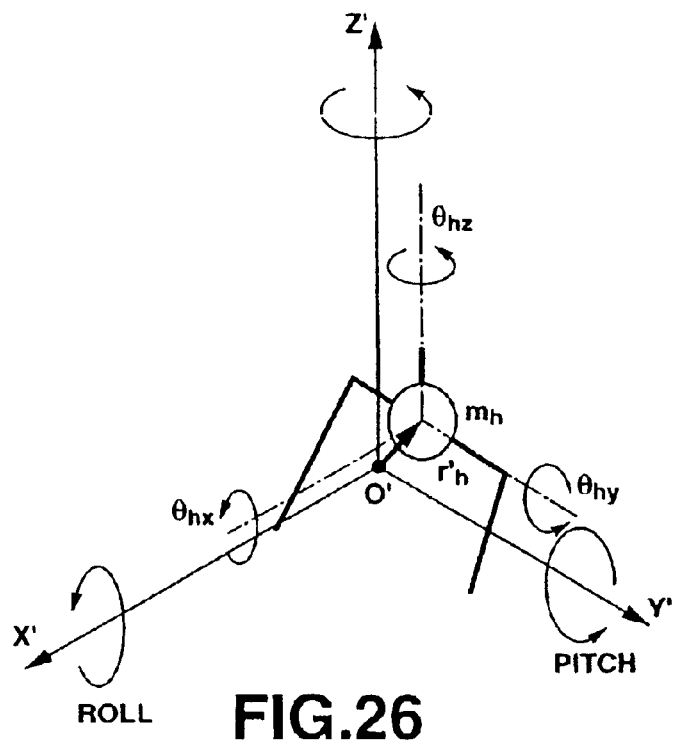
FIG. 26 is an enlarged view showing the vicinity of a waist in the multi mass point approximating model of the legged mobile robot shown in FIG. 21.

The multi mass point model is, so to speak, a representation of a robot in the form of a wire frame model. As may be seen from FIG. 21, the multi mass point approximating model of the present embodiment sets both shoulders 114R, 114L, both hinges 112R, 112L, both wrists 118R, 118L, body trunk part 102, waist 119 and both ankles 108R, 108L as mass points. In the waist part information of the multi mass point model, shown in FIG. 21, the rotational angles ($\theta_{hx}$, $\theta_{hy}$, $\theta_{hz}$) define the rotation of the orientation of the waist part in the legged mobile robot 100, that is roll, pitch and yaw axes. Meanwhile, FIG. 26 shows the waist part of the multi mass point model and its neighborhood to an enlarged scale.

The processing sequence for generating the walking pattern of the legged mobile robot 100, using the above-described multi mass point approximating model, is hereinafter explained.

Figure 27:
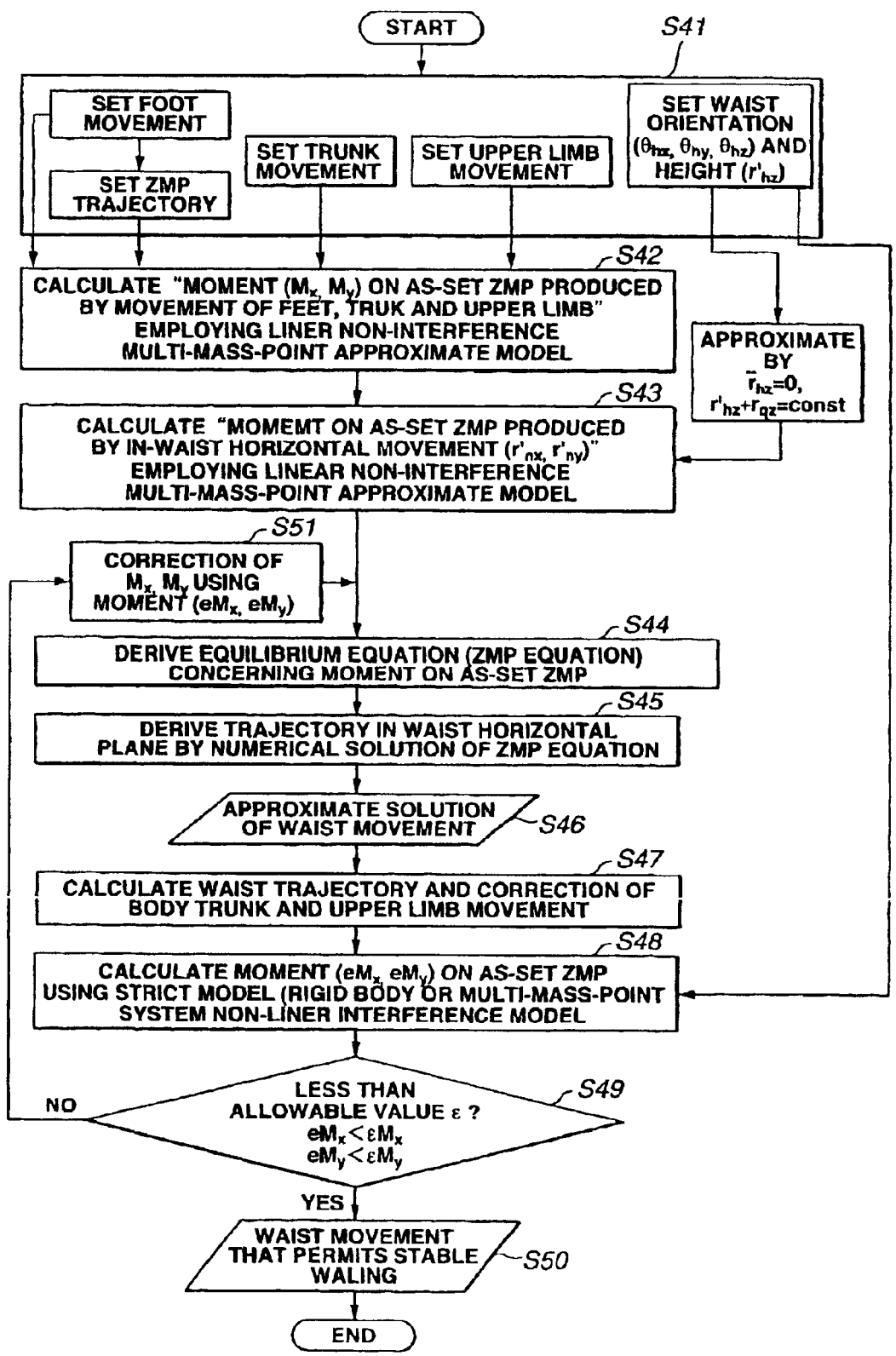
FIG. 27 is a flowchart showing a typical processing sequence for generating the walking pattern of the legged mobile robot.

FIG. 27 shows a flowchart for illustrating the processing sequence for generating the walking pattern of the legged mobile robot 100. It is assumed that, in the following, the respective joint positions and operations of the robot 100 are described, using the linear non-interference multi mass point approximating model, shown in FIG. 25, and that parameters shown in the following relation (2) is used, where symbols with dash marks (') state the kinematic coordinate system:

$m_h$: mass of the mass point of the waist part $\vec{r}'_h(r'_{hx}, r'_{hy}, r'_{hz})$: position vector of the mass point of the the waist part $m_i$: mass of the $i^{th}$ mass point $\vec{r}'_i$: position vector of the $i^{th}$ mass point $\vec{r}'_{zmp}$: position vector of ZMP $\vec{g}$ (gx,gy,gz): vector of the acceleration of the force of gravity O'-X'Y'Z': kinematic coordinate system (which moves with the robot)

O-XYZ: absolute coordinate system $H = i_{hz} + r_{qz}$

It is also presupposed that the waist part of the robot 100 is of a fixed height ($r'_{hz}+r_{qz}$=const) and that the mass point of the knee is zero. The following explanation is based on the flowchart of FIG. 27.

First, a pattern for actually determining the driving and operations of respective parts, such as the foot movement provided by a walking test, ZMP target trajectory, derived from the foot movement, body trunk movement, upper limb movement, and the orientation and height of the waist part, is set (step S41). It should be noted that only the Z' direction is set for the movements of the waist part, while the X' and Y' directions are assumed to be unknown.

Then, using a linear non-interference multi mass point approximating model, the moment on the as-set ZMP, generated with the movement in the horizontal plane of the waist part ($r'_{hx}, r'_{hy}$), is calculated (step S43).

The equilibrium equation pertinent to the moment on the as-set ZMP is then S44). More specifically, the following linear non-interfering ZMP equations (3):

$$+m_h H(\ddot{r}_{hx}+\ddot{r}_{qx}+g_x)-m_h g_z(r'_{hx}-r'_{zmpx})=-M_y(t)$$

$$-m_h H(\ddot{r}_{hy}+\ddot{r}_{qy}+g_y)+m_h g_z(r'_{hy}-r'_{zmpy})=-M_x(t) \quad (3)$$

are derived, in which the moments ($M_x$, $M_y$) generated by the foot part, body trunk and the upper limb movement are put in the right sides and the terms pertinent to the horizontal movements of the waist part mass point are put as unknown variable terms in the left sides, provided that $$\ddot{r}_{hz}=0$$

$$r'_{hz}+r_{qz}=\text{const (constant with respect to time)} \quad (4).$$

The above ZMP equation (3) is solved to calculate the trajectory in the horizontal plane in the waist part (step S45). For example, the numerical solution for the absolute horizontal position of the waist part ($r_{hx}, r_{hy}$), as an unknown variable, may be found (step S46) by solving the ZMP equation (3) using the well-known method for numerical solution such as the Euler method or by the Runge-Kutta method. The numerical solution, found here, is an approximate solution of the pattern of the waist part movements that permits stabilized walking and, more specifically, is the absolute horizontal position of the waist part which permits the ZMP to enter the target position. The ZMP target position is usually set on the foot sole touching the ground.

If the body trunk movement or upper limb movement, as preset, cannot be reaslized on the calculated approximate solution, the pattern of movements of the body trunk and upper limbs is re-set and corrected (step S47). At this time, the trajectory of the knee part may be calculated.

The moment on the as-set ZMP (eM$_x$, eM$_y$) on the precision model (that is a precision model of the robot 100 comprised of a rigid body or numerous mass points) is calculated by substituting the whole body movement obtained as described above (step S48). Although the non-precision model postulates that the above equation (4) holds, such postulation is not necessary in a precision model (that is, the constantness with respect to time is not required).

The moment (eM$_x$, eM$_y$) on the precision model is a moment error produced by the waist part movement. At the next step S49, it is checked whether or not the moment (eM$_x$, eM$_y$) is less than the allowed value ($\epsilon$M$_x$, $\epsilon$M$_y$) of the approximate moment in the non-precision model. If the moment is less than the allowable value $\epsilon$, the precise solution of the pattern of the stabilized waist part movement and stabilized walking can be realized (step S50). In the case of the legged robot, each foot part of which has six degrees of freedom (see FIG. 9), as in the present embodiment, the orientation of both legs may be unequivocally set by the positions of the respective feet and by the height as well as the horizontal position of the waist part. That is, generating the pattern of the waist part is equivalent to the "walking capacity" of the robot 100, that is its whole body movement pattern. The present routine is finished at step S50.

On the other hand, if the moment (eM$_x$, eM$_y$) in the precision model is equal to or larger than the allowed value ($\epsilon$M$_x$, $\epsilon$M$_y$) of the moment in the approximate model, the known produced moment (M$_x$, M$_y$) in the approximate model is corrected, using the moment (eM$_x$, eM$_y$) in the precision model (step S51) to derive again the ZMP equation to execute calculation and correction of the approximate solution of the waist part movement pattern in a repeated manner until the moment converges to a value less than the allowed value $\epsilon$.

Figure 28:
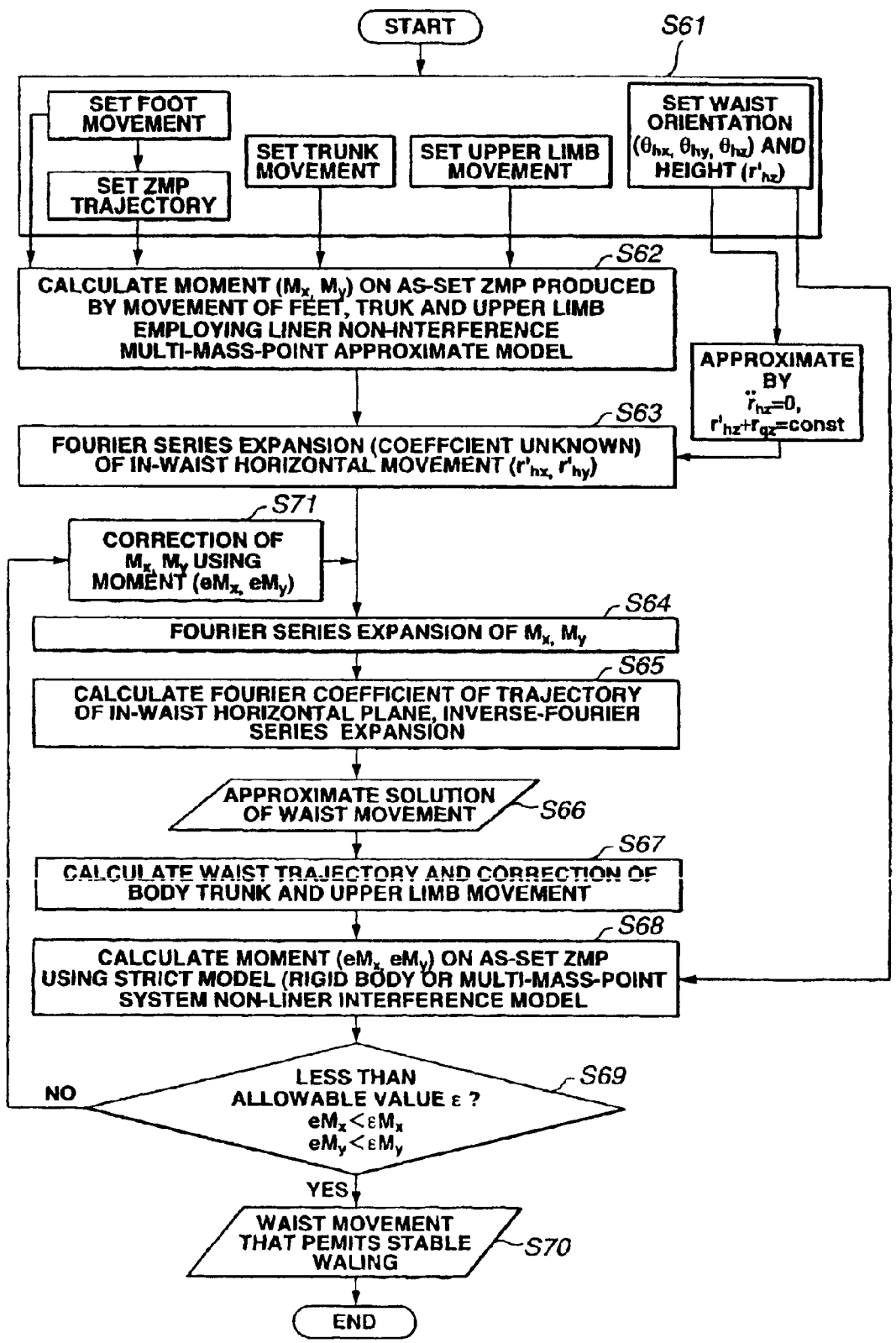
FIG. 28 is a flowchart showing another typical processing sequence for generating the walking pattern of the legged mobile robot.

FIG. 28 shows a flowchart of a modified embodiment of the processing sequence for generating the pattern of the whole body concerted movement of the legged mobile robot 100. It is assumed that, as in the embodiment shown in FIG. 27, the respective joint positions and movements of the robot 100 are stated using a linear non-interference multi mass point approximating model.

First, a pattern for actually determining the driving and operations of respective parts, such as the foot movement provided by a walking test, ZMP target trajectory, derived from the foot movement, body trunk movement, upper limb movement, and the orientation and height of the waist part, is set (step S61). It should be noted that only the Z' direction is set for the movements of the waist part, while the X' an Y' directions are assumed to be unknown.

Then, using a linear non-interference multi mass point approximating model, the moment on the as-set ZMP, around the pitch axis and the roll axis, generated with the (step S62).

The movement in the horizontal plane in the waist part ($r'_{hx}, r'_{hy}$) is expanded into Fourier series (step S63). As is well-known in the art, expansion into Fourier series allows to transform time domain components into frequency domain components. That is, in the present case, the movements of the waist part can be comprehended as periodic movements. On the other hand, since the FFT (fast Fourier transform) can be applied, the speed of calculations can be enhanced appreciably.

The moments (M$_x$, M$_y$) around the pitch axis and the roll axis on the as-set ZMP can also be expanded to Fourier series (step S64).

The Fourier coefficients of the trajectory in the horizontal plane of the waist then are calculated and subjected to inverse Fourier series expansion (step S65) to find an approximate solution of the movements of the waist part (step S66). The approximate solution, found here, is an approximate solution ($r'_{hx}$, $r'_{hy}$) of the absolute horizontal position of the waist part which defines the movement pattern of the waist part that permits stable walking and more specifically is the absolute horizontal position of the waist part that permits the ZMP to enter the target position. The target ZMP position is usually set on the foot sole part that has touched the ground.

If the preset movement of the body trunk and the upper limb cannot be realized on the calculated be realized approximate solution, the pattern of the movement of the body trunk and the upper limb part is re-set and corrected (step S67). At this time, the trajectory of the knee part can be calculated.

The whole body movement pattern, obtained as described above, is then substituted to calculate the moment ($eM_x$, $eM_y$) in the precision model of the robot 100 comprised of a rigid body or of numerous mass points (step S68). Although the non-precision model postulates that the above equation (4) holds, such postulation is not necessary in a precision model (that is, the constantness with respect to time is not required).

The moment ($eM_x$, $eM_y$) on the precision model is a moment error produced by the waist part movement. At the next step S69, it is checked whether or not the moment ($eM_x$, $eM_y$) is less than the allowed value ($\epsilon M_x$, $\epsilon M_y$) of the approximate model. If the moment is less than the allowable value $\epsilon$, the precise solution of the pattern of the stabilized waist part movement and the whole body concerted movement that may realize stabilized walking is obtained (step S70). So, the present routine is finished.

If conversely the moment ($eM_x$, $eM_y$) in the precision model is not less than the allowable value ($\epsilon M_x$, $\epsilon M_y$) in the approximate model, the known generated moment ($M_x$, $M_y$) in the non-precision model is corrected (step S71) and again expanded into Fourier series to repeat the calculation and correction of the approximate solution of the pattern of the waist part movement until the moment converges to less than the allowed value $\epsilon$.

Although the present invention has so far been elucidated with reference to several preferred embodiments, it is obvious that the present invention can be suitable corrected or replaced by those skilled in the art within the scope of the invention.

In the above-described embodiments, the present invention is applied to a humanoid robot walking on two legs. However, the scope of application of the present invention is not limited to a robot walking on two legs. For example, the present invention may naturally be applied to a pet type robot walking on four legs, other legged robots and to mobile robots other than the legged robots, with similar operation and results.

The foregoing des is merely illustrative and should not be construed in a limiting fashion. The purport of the present invention can be best understood by having reference to the claims.

INDUSTRIAL APPLICABILITY

The present invention is directed to a legged mobile robot having plural movable legs in which the amounts of the relative movements between the foot part and the road surface are measured by a relative movement measurement sensor mounted on the foot sole of the movable leg and in which the movements of the legged mobile robot are controlled on the basis of the amounts of the relative movements between the foot part and the road surface as measured by the relative movement measurement sensor. So, the legged mobile robot is able to walk on variable road surfaces or perform other movement operations with movable legs.

What is claimed is:

1. A legged mobile robot having at least a plurality of movable legs, comprising:
    a relative movement measurement sensor arranged on the foot sole of each movable leg for measuring the amounts of relative movements between the foot part and the road surface; and
    a controller for controlling the movements of the legged mobile robot based on the amounts of relative movements between the foot part and the road surface as measured by the relative movement measurement sensor;
    wherein the controller transfers to a safe movement operation pattern for the road surface responsive to the amount of the relative movement between the foot part and the road surface exceeding a preset threshold value during movement on the road surface.

2. The legged mobile robot according to claim 1 wherein the relative movement measurement sensor measures the amount of the relative movement of the foot part relative to a direction parallel to the road surface and/or the amount of the relative movement of the foot part around a normal of the road surface.

3. The legged mobile robot according to claim 1 wherein the relative movement measurement sensor includes imaging means for imaging a ground touching surface of the foot part, image processing means for comparing images photographed by the imaging means at a preset time interval and calculating means for calculating the amount of the relative movement relative to the road surface of the foot part at the preset time interval based on the results of image comparison by the image processing means.

4. The legged mobile robot according to claim 1 wherein the relative movement measurement sensor is able to measure the amount of the relative movement of the foot part in a direction parallel to the road surface and calculates the amount of the relative movement around a normal of the road surface by chronologically joining the amounts of the relative movement in the direction parallel to the road surface of the foot part as measured at preset time intervals.

5. The legged mobile robot according to claim 1 wherein two or more relative movement measurement sensors are provided on each foot part at a spacing from one another and wherein the measured results of the relative movement measurement sensors are compared to one another to calculate the amount of the relative movement of the foot part around a normal of the road surface.

6. The legged mobile robot according to claim 1 wherein said controller halts the movement on the road surface responsive to the amount of the relative movement between the foot part and the road surface exceeding a preset threshold value during movement on the road surface.

7. The legged mobile robot according to claim 1 wherein said controller halts the movement on the road surface responsive to the amount of the relative movement between the foot part and the road surface exceeding a preset threshold value during movement on the road surface and verifies whether or not the movement operation can further be continued.

8. The legged mobile robot according to claim 1 wherein said controller halts the movement on the road surface responsive to the amount of the relative movement between the foot part and the road surface exceeding a preset threshold value during movement on the road surface, verifies whether or not the movement operation can further be continued and executes a preset assistance request operation in case the controller verifies that the movement operations cannot be continued.

9. The legged mobile robot according to claim 1 wherein said controller halts the movement on the road surface responsive to the amount of the relative movement between the foot part and the road surface exceeding a preset threshold value during movement on the road surface and searches the state of the road surface.

10. The legged mobile robot according to claim 1 wherein said controller halts the movement on the road surface responsive to the amount of the relative movement between the foot part and the road surface exceeding a preset threshold value during movement on the road surface, searches the state of the road surface and executes an operation corresponding to searched results.

11. The legged mobile robot according to claim 1 wherein the safe movement operation pattern is enlarging the incidence angle of the foot part touching the road surface, lowering the movement speed, diminishing the footstep of each movable leg or correcting the ZMP trajectory.

12. The legged mobile robot according to claim 1 wherein the controller transfers to the movement operations under searching the road surface responsive to the amount of the relative movement between the foot part and the road surface exceeding a preset threshold value during walking on the road surface.

13. The legged mobile robot according to claim 1 wherein the controller executes the processing of selecting a foot sole suited to the road surface responsive to the amount of the relative movement between the foot part ands the road surface exceeding a preset threshold value during walking on the road surface.

14. A method for controlling a legged mobile robot having at least a plurality of movable legs, comprising:

a measurement step of measuring the amounts of relative movements between the foot part and the road surface when the respective movable legs touch the road surface; and a controlling step of controlling the movements of the legged mobile robot based on the amounts of relative movements between the foot part and the road surface as measured;

wherein the controller transfers to a safe movement operation pattern for the road surface responsive to the amount of the relative movement between the foot part and the road surface exceeding a preset threshold value during movement on the road surface.

15. The method for controlling the legged mobile robot according to claim 14 wherein the measurement step measures the amount of the relative movement of the foot part relative to a direction parallel to the road surface and/or the amount of the relative movement of the foot part around a normal of the road surface.

16. The method for controlling the legged mobile robot according to claim 14 further comprising:

a calculating step of calculating the amount of the relative movement around a normal of the road surface by chronologically joining the amounts of the relative movement in the direction parallel to the road surface of the foot part as measured in the measurement step at preset time intervals.

17. The method for controlling the legged mobile robot according to claim 14 wherein the measurement step includes a calculating step of measuring the amount of the relative movement between the foot part and the road surface at two or more spaced apart points and comparing the amounts of the relative movement measured at two or more points to one another to calculate the amount of the relative movement of the foot part around a normal of the road surface.

18. The method for controlling the legged mobile robot according to claim 14 wherein said controller halts the movement on the road surface responsive to the amount of the relative movement between the foot part and the road surface exceeding a preset threshold value during movement on the road surface.

19. The method for controlling the legged mobile robot according to claim 14 wherein said controller halts the movement on the road surface responsive to the amount of the relative movement between the foot part and the road surface exceeding a preset threshold value during movement on the road surface and verifies whether or not the movement operation can further be continued.

20. The method for controlling the legged mobile robot according to claim 14 wherein said controller halts the movement on the road surface responsive to the amount of the relative movement between the foot part and the road surface exceeding a preset threshold value during movement on the road surface, verifies whether or not the movement operation can further be continued and executes a preset assistance request operation in case the controller verifies that the movement operations cannot be continued.

21. The method for controlling the legged mobile robot according to claim 14 wherein said controller halts the movement on the road surface responsive to the amount of the relative movement between the foot part and the road surface exceeding a preset threshold value during movement on the road surface and searches the state of the road surface.

22. The method for controlling the legged mobile robot according to claim 14 wherein said controller halts the movement on the road surface responsive to the amount of the relative movement between the foot part and the road surface exceeding a preset threshold value during movement on the road surface, searches the state of the road surface and executes an operation corresponding to searched results.

23. The method for controlling the legged mobile robot according to claim 14 wherein the safe movement operation pattern is enlarging the incidence angle of the foot part touching the road surface, lowering the movement speed, diminishing the footstep of each movable leg or correcting the ZMP trajectory.

24. The method for controlling the legged mobile robot according to claim 14 wherein the controller transfers to the movement operations responsive to the amount of the relative movement between the foot part and the road surface exceeding a preset threshold value during walking on the road surface.

25. The method for controlling the legged mobile robot according to claim 14 wherein the controller executes the processing of selecting a foot sole suited to the road surface responsive to the amount of the relative movement between the foot part and the road surface exceeding a preset threshold value during walking on the road surface.

26. A relative movement measurement sensor for a legged mobile robot for measuring the amount of relative movement between a foot part and the road surface, the sensor being applicable to a foot part of a legged mobile robot having at least a plurality of movable legs comprising:

imaging means for imaging a ground touching surface of the foot part;

image processing means for comparing images photographed by the imaging means at a preset time interval; and calculating means for calculating the amount of the relative movement relative to the road surface of the foot part at the preset time interval based on the results of image comparison by the image processing means.

* * * * *